(12) United States Patent
VanNieulande et al.

(10) Patent No.: US 10,632,888 B2
(45) Date of Patent: Apr. 28, 2020

(54) MANUAL RECLINE SWIVEL MECHANISM

(71) Applicant: Ford Global Technologies, LLC, Dearborn, MI (US)

(72) Inventors: Kevin VanNieulande, Fraser, MI (US); John Wayne Jaranson, Dearborn, MI (US); Christian J. Hosbach, Taylor, MI (US); Victoria Leigh Schein, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 258 days.

(21) Appl. No.: 15/827,859

(22) Filed: Nov. 30, 2017

(65) Prior Publication Data

US 2019/0160983 A1 May 30, 2019

(51) Int. Cl.
*B60N 2/20* (2006.01)
*B60N 2/90* (2018.01)
*B60N 2/07* (2006.01)
*B60N 2/68* (2006.01)
*B60N 2/14* (2006.01)
*B60N 2/08* (2006.01)
*B60N 2/50* (2006.01)

(52) U.S. Cl.
CPC .......... *B60N 2/919* (2018.02); *B60N 2/0745* (2013.01); *B60N 2/0875* (2013.01); *B60N 2/146* (2013.01); *B60N 2/686* (2013.01); *B60N 2/08* (2013.01); *B60N 2/502* (2013.01)

(58) Field of Classification Search
None
See application file for complete search history.

(56) References Cited

U.S. PATENT DOCUMENTS

| 30,706 | A | * | 11/1860 | VanVleck |
| 2,587,679 | A | * | 3/1952 | Atkinson ................ B60N 2/06 296/68 |
| 3,622,202 | A | * | 11/1971 | Brown .................... A47C 1/02 297/344.1 |
| 4,971,392 | A | * | 11/1990 | Young .................. B60N 2/2821 297/256.12 |
| 6,070,943 | A | | 6/2000 | Guery-Strahm |
| 6,224,018 | B1 | | 1/2001 | Hinestroza |
| 6,196,629 | B1 | * | 3/2001 | Onishi ................ B60N 2/2806 297/256.12 |
| 6,572,172 | B1 | * | 6/2003 | Ninomiya ............ B60N 2/0232 296/65.07 |

(Continued)

*Primary Examiner* — Sarah B McPartlin
(74) *Attorney, Agent, or Firm* — Dave Coppiellie; Price Heneveld LLP

(57) ABSTRACT

A seating assembly comprising a shell assembly, a base assembly operably coupled to the shell assembly, and a control assembly including a handle. The control assembly comprises a spindle gear positioned within the base assembly, a gear plate disposed in the shell assembly proximate the spindle gear, a locking key configured to simultaneously engage the spindle gear and the gear plate, a locking leaf spring configured to bias the locking key into engagement with the spindle gear and the gear plate, and an actuator configured to withdraw the locking key from engagement with one of the gear plate and spindle gear and subsequently withdraw the locking key from engagement with the other of the gear plate and spindle gear.

18 Claims, 18 Drawing Sheets

(56) References Cited

U.S. PATENT DOCUMENTS

| | | | |
|---|---|---|---|
| 7,073,859 B1 * | 7/2006 | Wilson | B60N 2/0232 |
| | | | 297/250.1 |
| 7,575,276 B1 * | 8/2009 | Henry | B60N 2/2821 |
| | | | 297/256.12 |
| 2011/0051962 A1 | 3/2011 | Cochran | |

* cited by examiner

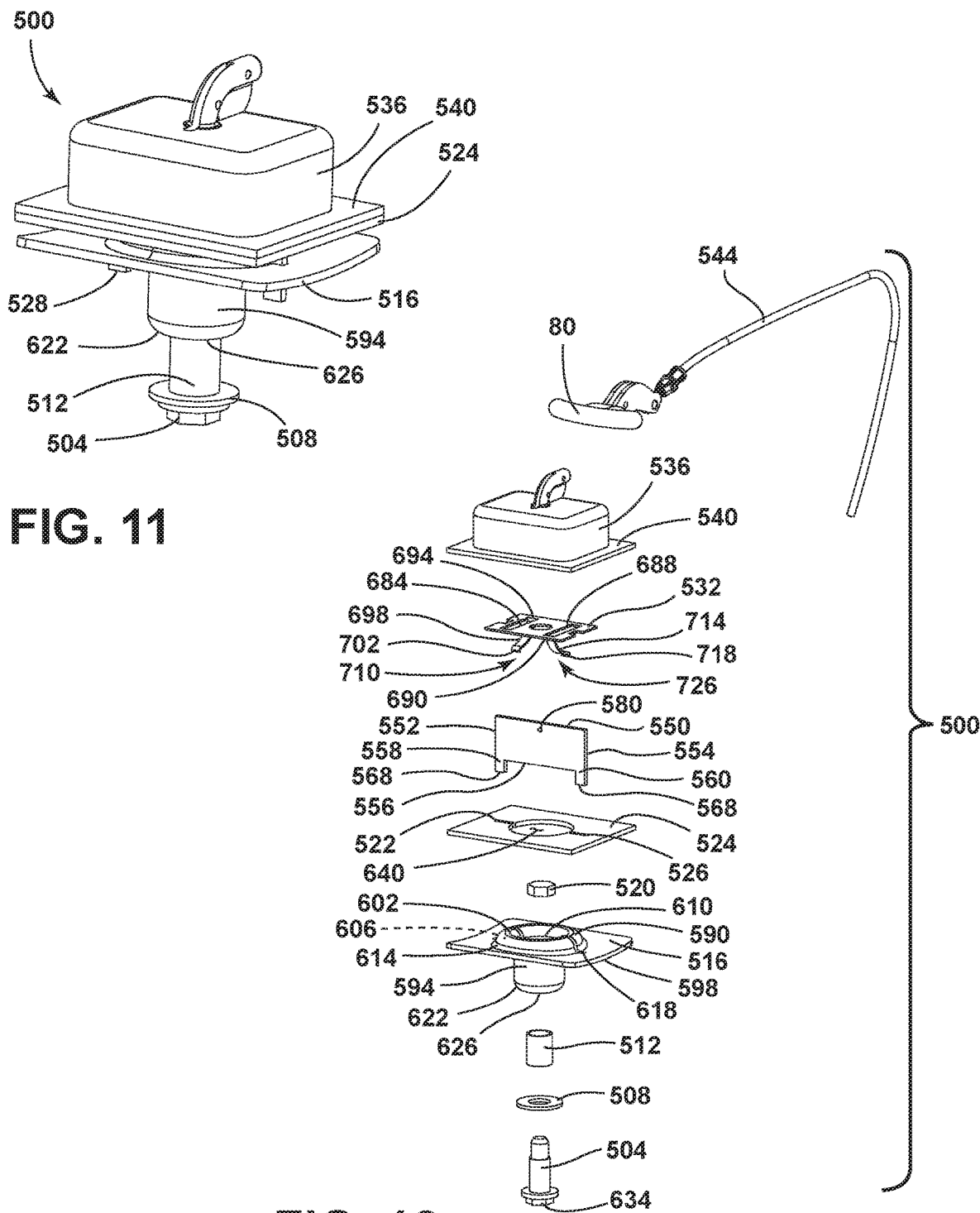

MANUAL RECLINE SWIVEL MECHANISM

FIELD OF THE DISCLOSURE

The present disclosure generally relates to a seating assembly. More specifically, the present disclosure relates to an egg-shaped seating assembly.

BACKGROUND OF THE DISCLOSURE

Currently, seating assemblies include a seat base and a seatback. With the introduction of autonomous vehicles and reconfigurable interiors, occupants are interested in to develop new seating designs that allow forward passengers to face the rear.

SUMMARY OF THE DISCLOSURE

According to a first aspect of the present disclosure, a seating assembly is disclosed. The searing assembly comprises a shell assembly, a base assembly operably coupled to the shell assembly, and a control assembly including a handle. The control assembly comprises a spindle gear positioned within the base assembly, a gear plate disposed in the shell assembly proximate the spindle gear, a locking key configured to simultaneously engage the spindle gear and the gear plate, a locking leaf spring configured to bias the locking key into engagement with the spindle gear and the gear plate, and an actuator configured to withdraw the locking key from engagement with one of the gear plate and spindle gear and subsequently withdraw the locking key from engagement with the other of the gear plate and spindle gear.

Embodiments of the first aspect of the present disclosure can include any one or a combination of the following features:
- the base assembly further comprises an outer base shell defining a recess and an inner base shell coupled to the spindle gear;
- the base assembly further comprises an opening defined by the outer base shell within the recess, wherein the spindle gear is disposed within the opening;
- the base assembly further comprises first and second opposing ball bearing inserts disposed within the recess;
- an inner shell is operably coupled with an outer shell, wherein a gear plate is disposed between the inner shell and the outer shell; and/or
- a guide shoe retainer is slidably coupled to the inner shell and rotatably coupled to the base assembly.

According to a second aspect of the present disclosure, a seating assembly is disclosed. The seating assembly comprises a base assembly defining a recess, wherein a spindle gear is disposed within the recess, a shell assembly operably coupled to the base assembly within the recess and including a gear plate, and a control assembly, including a locking key selectively engageable with both the spindle gear and the gear plate to control movement of the shell assembly relative to the base assembly.

Embodiments of the second aspect of the present disclosure can include any one or a combination of the following features:
- the control assembly further comprises a locking leaf spring operably coupled to the locking key and an actuator configured to move the locking key between an engaged position, an intermediate position, and a released position;
- the actuator is coupled to a handle disposed on the shell assembly; and/or
- the recess of the base assembly includes ball bearing inserts, and further wherein the ball bearing inserts contact the shell assembly.

According to a third aspect of the present disclosure, a seating assembly for a vehicle is disclosed. The seating assembly comprises a base assembly coupled to a floor of said vehicle, a shell assembly operably coupled to the base assembly and including a reclining feature and a rotating feature engageable by a single locking key, and a control assembly including a handle configured to alternate the locking key between an engaged position and a released position.

Embodiments of the third aspect of the present disclosure can include any one or a combination of the following features:
- the base assembly includes an inner base shell nested within an outer base shell and a spindle gear nested between the inner base shell and the outer base shell;
- the shell assembly is secured to the base assembly using a retaining assembly positioned through the spindle gear;
- the retaining assembly further comprises a guide shoe retainer, a sleeve, and a bolt
- the shell assembly includes a gear plate;
- the locking key is selectively engageable with one of the spindle gear and the gear plate and is subsequently engageable with the other of the spindle gear and the gear plate;
- the control assembly further comprises a locking spring operably coupled to the locking key and an actuator coupled to the locking spring and configured to control the engagement of the locking spring;
- the actuator is coupled to a handle disposed proximate the shell assembly;
- the shell assembly forms headrest wings around a headspace; and/or
- the shell assembly includes armrests integrally formed with the shell assembly.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 11 is a side perspective view of a control assembly of the present disclosure;

FIG. 12 is an exploded side perspective view of the control assembly of FIG. 11;

DETAILED DESCRIPTION OF THE EMBODIMENTS

Figure 1A:
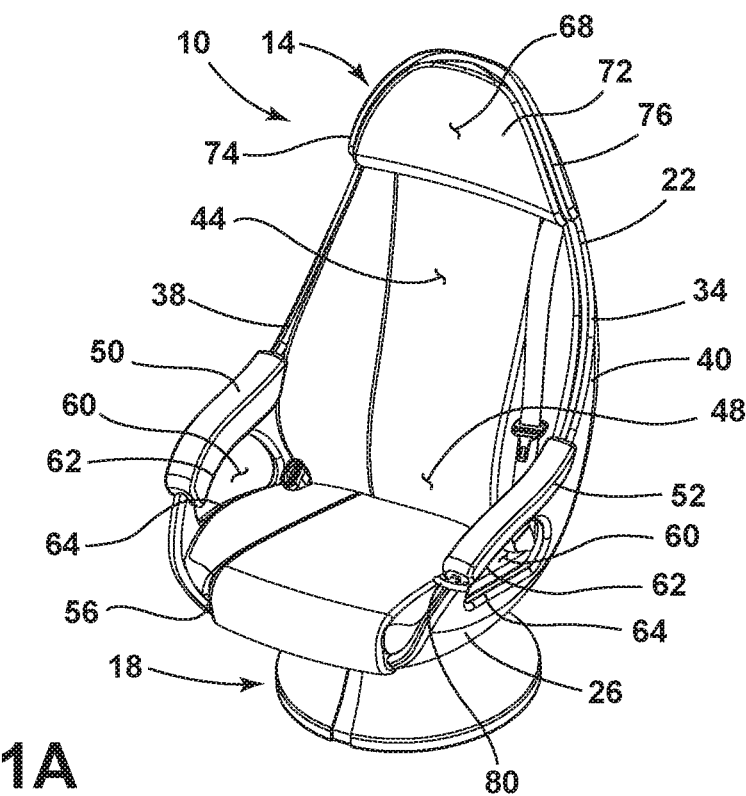
FIG. 1A is a first side perspective view of an embodiment of a seating assembly of the present disclosure.

For purposes of description herein, the terms "upper," "lower," "right," "left," "rear," "front," "vertical," "horizontal," and derivatives thereof shall relate to the concepts as oriented in FIG. 2B. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to the embodiment generally illustrated in FIGS. 1A-23B, reference numeral 10 generally designates a seating assembly comprising a shell assembly 14, a base assembly 18 operably coupled to the shell assembly 14, and a control assembly 500. The control assembly 500 comprises a spindle gear 160 positioned within the base assembly 18, a gear plate 178 disposed within the shell assembly 14 and proximate the spindle gear 160, a locking key 528 configured to simultaneously engage the spindle gear 160 and gear plate 178, a locking leaf spring 532 configured to bias the locking key 528 into engagement with the spindle gear 160 and the gear plate 178, and an actuator 544 configured to withdraw the locking key 528 from engagement with one of the gear plate 178 and spindle gear 160 and subsequently withdraw the locking key 528 from engagement with the other of the gear plate 178 and spindle gear 160.

Referring now to FIG. 1A, the seating assembly 10 includes the shell assembly 14 operably coupled with the base assembly 18. The shell assembly 14 includes a seatback 22 and a seat base 26. The seatback 22 and the seat base 26 are continuous and integral and form an elliptical back panel 34. The back panel 34 may round forward on either side to form lateral profile protrusions 38, 40 that frame a shoulder space 44 and a hip space 48. The shell assembly 14 of the illustrated embodiment in FIG. 1A also includes non-linear armrests 50, 52 integrally formed with the back panel 34 and extending forwardly from the seatback 22 to a front edge 56 of the seat base 26. The armrests 50, 52 and the seat base 26 define an arch-shaped opening 60 with a curved upper edge 62 formed by the armrest 50, 52 and a substantially linear lower edge 64 formed by the seat base 26. The shell assembly 14 further includes a headrest 72 including two opposing headrest wings 74, 76 integrally formed with the back panel 34 defining a headspace 68. The shell assembly 14 is at least partially ovoid in shape where the headspace 68 has a lesser diameter than the shoulder space 44 and the shoulder space 44 has a lesser diameter than the hip space 48. The shell assembly 14 may also include a handle 80 disposed on or proximate to the shell assembly 14 so that an occupant may easily reach the handle 80 while seated.

Figure 1B:
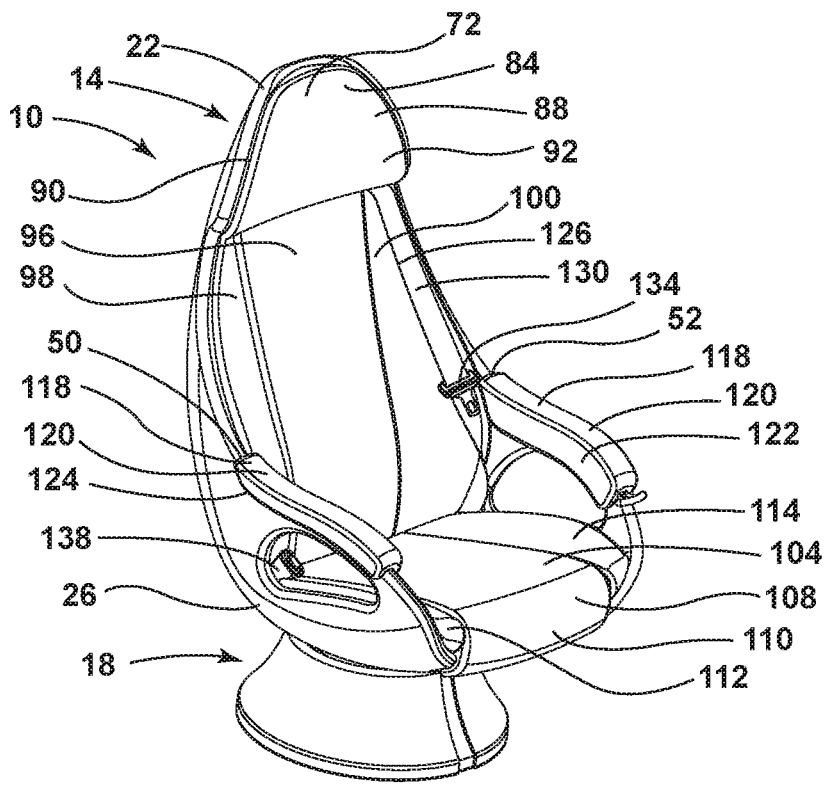
FIG. 1B is a second side perspective view of the seating assembly of FIG. 1A.

As shown in the illustrated embodiment of FIG. 1B, cushioning 84 is covered by trim stock 88 and is disposed on a front surface 90 of the shell assembly 14, including the headrest 72, the seatback 22, the armrests 50, 52, and the seat base 26. The cushioning 84 includes a headrest cushion 92 extending further forward than a middle seatback cushion 96, and the headrest cushion 92 may be adjustable for the comfort of the occupant. The middle seatback cushion 96 is coupled to the seatback 22 and centered so that the middle seatback cushion 96 is framed by two opposing lateral seatback cushions 98, 100 coupled to the lateral profile protrusions 38, 40. Further, the seat base 26 has a middle seat base cushion 104 disposed substantially perpendicular to the middle seatback cushion 96 and extending past a front edge 56 of the seat base 26. The middle seat base cushion 104 may include a rounded front edge 108 that wraps downward and creates a bolster 110 for the occupant's legs. The middle seat base cushion 104 is framed by two opposing lateral seat base cushions 112, 114. An armrest cushion 118 is disposed on an upper surface 120 of each armrest 50, 52 and may extend down an interior lateral surface 122 and/or an exterior lateral surface 124. A safety restraint 126 is coupled to the shell assembly 14 so that a webbing 130 of the safety restraint 126 extends between or through the cushioning 84. The safety restraint 126 may be a three-point restraint with the webbing 130 configured to extend diagonally across the shell assembly 14 and may also include a tongue latch 134. A buckle assembly 138 may be disposed on the opposite side of the shell assembly 14 and configured to receive the tongue latch 134 coupled to the safety restraint 126. The configuration of the safety restraint 126 and the buckle assembly 138 is exemplary only, and it is contemplated that the configuration of the safety restraint 126 and/or the buckle assembly 138 may include, for example, a five-point restraint extending from either side of the shoulder space 44 and connecting with the buckle assembly 138 disposed on in the center of the seat base 26 or a three-point restraint extending from the opposite lateral profile protrusion 38, 40 of the seatback 22 and connecting with the buckle assembly 138 disposed on the opposite side from the embodiment shown in FIGS. 1A-2.

Figure 1C:
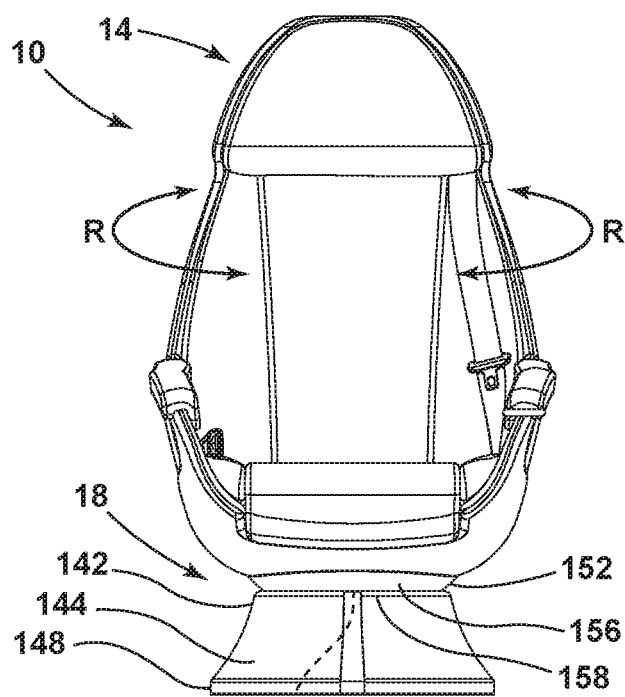
FIG. 1C is a front elevational view of the seating assembly of FIG. 1A.

Referring now to FIG. 1C, the base assembly 18 includes an upper portion 142 of a first diameter and a lower portion 144 of a second diameter sufficient to support the shell assembly 14. The first diameter is less than the second diameter such that the base assembly 18 is at least partially frustoconical. The lower portion 144 may include a lip 148 extending downward and maintaining the second diameter. The upper portion 142 defines a recess 152 extending downward from the top of the base assembly 18 and surrounded by a rim 158. The shell assembly 14 includes a rounded bottom 156 nested within the base assembly 18 so that the seat base 26 is positioned above the rim 158 of the recess 152 and can rotate 360 degrees around a center axis as shown by arrows R. Within those 360 degrees, the shell assembly 14 may be in one of twenty-two various positions, where each position corresponds to one of twenty-two gear teeth 376 on the spindle gear 160, as disclosed in further detail herein. It is contemplated that the number of positions available may vary by adding or removing gear teeth 376 without departing from the scope of the disclosure. Further, the seating assembly 10 may be disposed within a vehicle such that the base assembly 18 is operably coupled to the floor of said vehicle.

Figure 2:
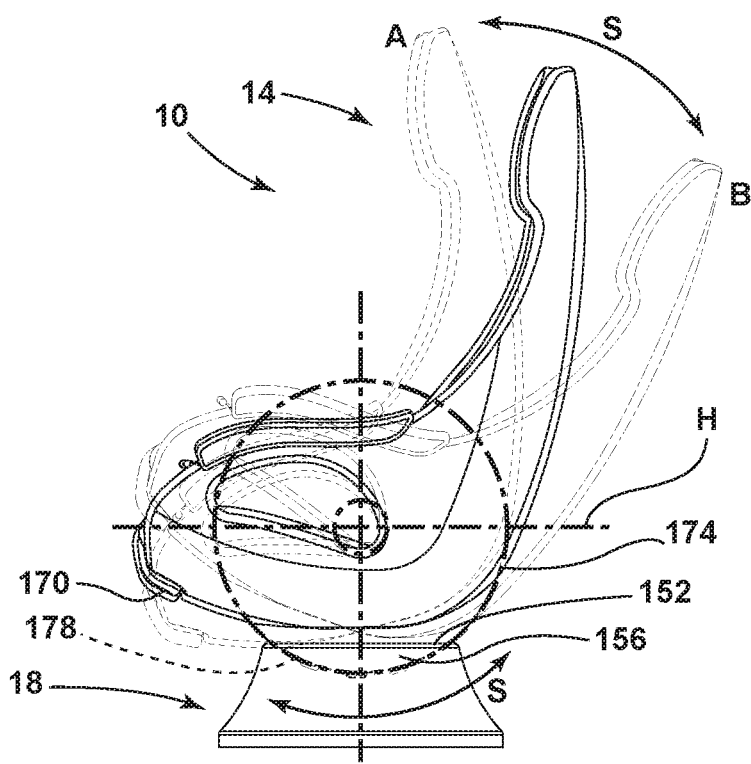
FIG. 2 is a side elevational view of the seating assembly of FIG. 1A showing exemplary positions of a shell assembly in phantom.

Referring to FIG. 2, the shell assembly 14 is coupled with the base assembly 18 to allow the shell assembly 14 to slide forward and backward as allowed by the gear plate 178 disposed within the shell assembly 14. The general shape of the bottom 156 is spherical wherein the front of the bottom begins at a front portion 170 of the seat base 26. The bottom 156 extends rearwardly to a back portion 174 the seat base 26. This shape allows the shell assembly 14 to be adjusted, as shown by arrows S, between a first reclined position A and a second reclined position B. The shell assembly 14 may be disposed at any angle between position A and position B. In the present embodiment, the shell assembly 14 is adjustable between twenty-five positions, including position A and position B, where the H-point H of the occupant is consistent. Each of the twenty-five positions corresponds to one of twenty-five gear teeth 474 in a gear plate 178, as disclosed in further detail herein. It is contemplated that the number of positions available may vary by adding or removing gear teeth 474 without departing from the scope of the disclosure.

Figure 3A:
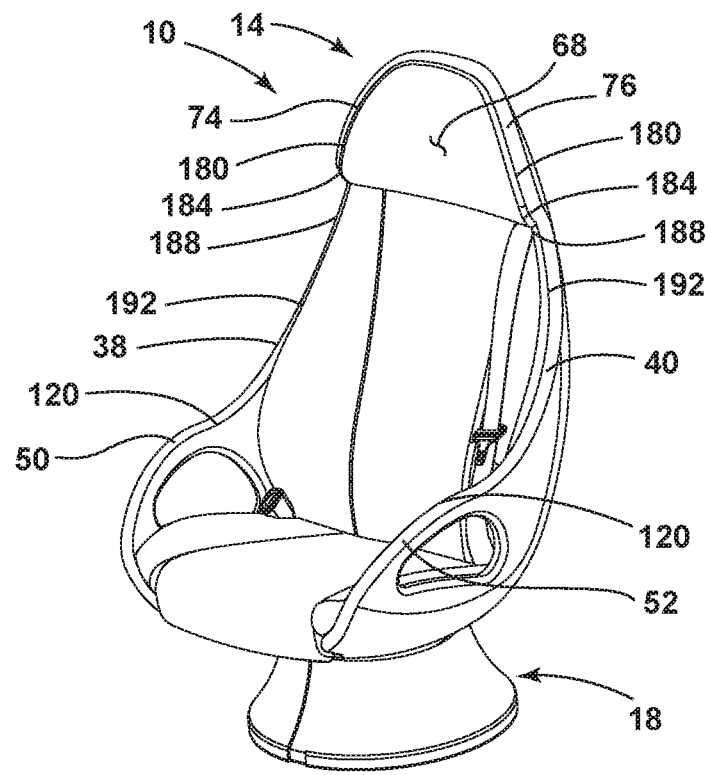
FIG. 3A is a side perspective view of an embodiment of a low profile seating assembly.
Figure 3B:
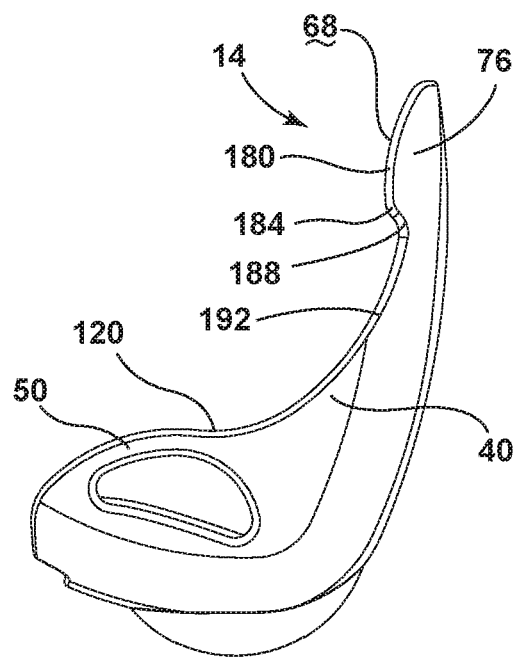
FIG. 3B is a side elevational view of a shell assembly of the low profile seating assembly of FIG. 3A.

Referring now to FIGS. 3A-6B, alternative shapes for the headrest wings 74, 76 and the lateral profile protrusions 38, 40 of the shell assembly 14 are shown with respective profile views. FIGS. 3A and 3B show a low profile design for the shell assembly 14. The low profile design includes a lower profile of the shell assembly 14 wherein the headrest wings 74, 76 extend a first distance from the headrest 72. The headrest wings 74, 76 curve toward the front of the shell assembly 14 to frame the headspace 68. The headrest wings 74, 76 each include a front rounded edge 180 that includes a lower corner 184 curving at a sharper angle than the front rounded edge 180. When viewed from an elevational view, as shown in FIG. 3B, the lower corner 184 forms an angle greater than 90 degrees that leads into a second inverted corner 188 mirroring the lower corner 184 to form a flattened "S" shape. The second inverted corner 188 joins the front rounded edge 180 and the lower corner 184 to a sloping, non-linear front edge 192 of the lateral profile protrusions 38, 40 of the seatback 22 that extends down to form the upper surface 120 of the armrest 50, 52.

Figure 4A:
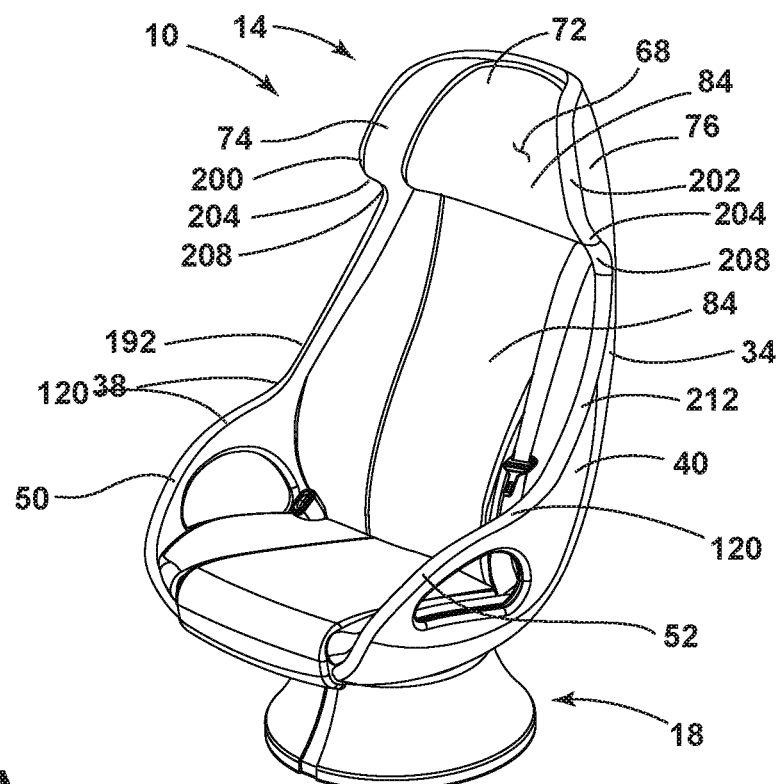
FIG. 4A is a side perspective view of an embodiment of a medium profile seating assembly.
Figure 4B:
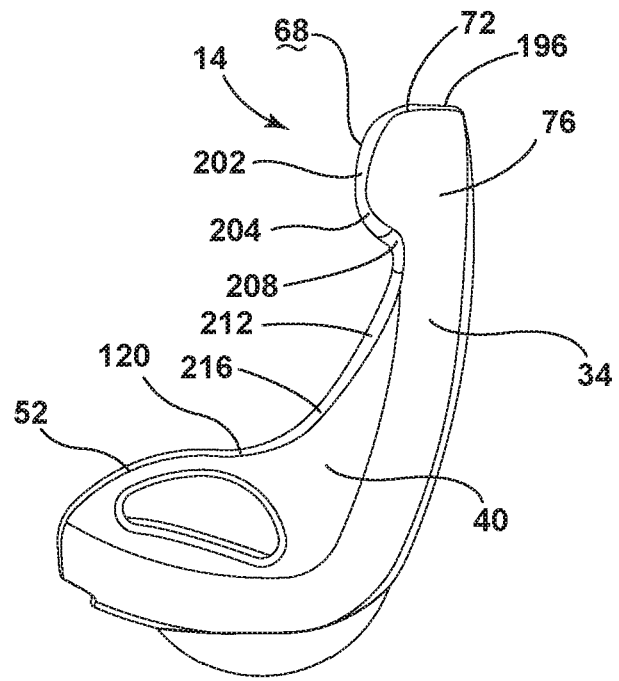
FIG. 4B is a side elevational view of a shell assembly of the medium profile seating assembly of FIG. 4A.

Referring now to FIGS. 4A and 4B, the shell assembly 14 is shown with a medium profile wherein the headrest wings 74, 76 extend a second distance from the headrest 72 to frame the headspace 68. The second distance is greater than the first distance so that the headrest wings 74, 76 extend further around the headspace 68. In the medium embodiment, as illustrated in FIG. 4B, the headrest wings 74, 76 are more rectangular and include a substantially linear top surface 196 that curves forward to form two substantially linear front surfaces 200, 202. The front surfaces 200, 202 each include a rounded lower corner 204 forming an angle greater than 90 degrees when viewed from the elevational view illustrated in FIG. 4B. The lower corner 204 continues to a second inverted corner 208, forming an "S" shape that is less flattened than the low profile embodiment. The second inverted corner 208 extends down the lateral profile protrusion 38, 40 of the shell assembly 14 to form a non-linear front edge 212 and the upper surface 120 of the armrest 50, 52. The periphery of the shell assembly 14 includes a beveled outer edge 216 (FIG. 4B) that extends from the top surface 196 and front surfaces 200, 202 to the back panel 34. The cushioning 84 disposed on the headrest 72 and lateral profile protrusions 38, 40 of the shell assembly 14 may be extended to the front surfaces 200, 202 of the lateral profile protrusions 38, 40, or the cushioning 84 may maintain the shape of a low profile embodiment, as shown in FIG. 4A.

Figure 5A:
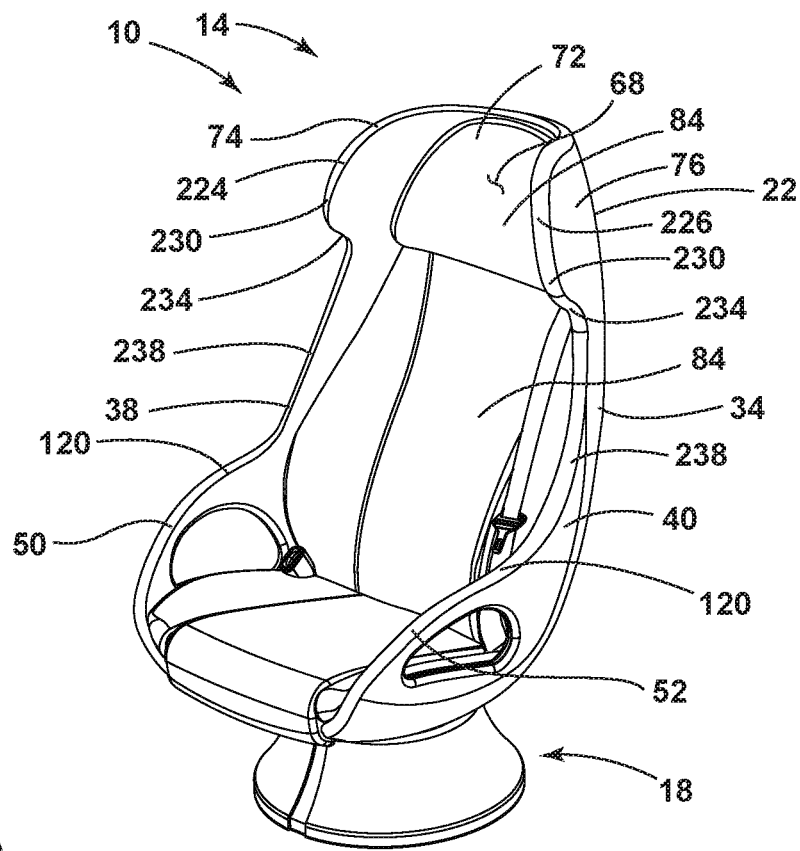
FIG. 5A is a side perspective view of an embodiment of a high profile seating assembly.
Figure 5B:
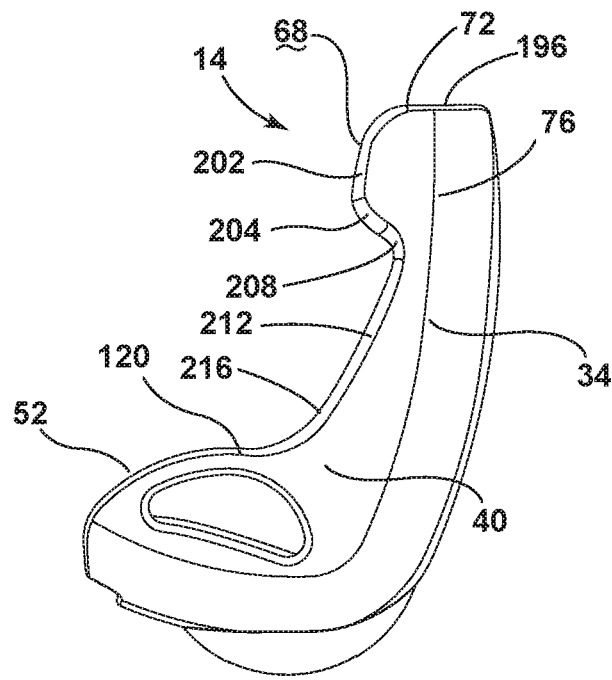
FIG. 5B is a side elevational view of a shell assembly of the high profile seating assembly of FIG. 5A.

Referring now to FIGS. 5A and 5B, a high profile design for the shell assembly 14 is shown wherein the headrest wings 74, 76 extend a third distance from the headrest 72 to frame the headspace 68. The third distance is greater than the second distance and allows for a generally square profile of the headrest wings 74, 76. The headrest wings 74, 76 include a substantially linear top surface 220 which curves forward to form two substantially linear front surfaces 224, 226. Each of the front surfaces 224, 226 extends down to a rounded lower corner 230 and a second inverted corner 234 of a similar size and shape, where both corners 230, 234 form angles greater than 90 degrees when viewed from an elevational view, as shown in FIG. 5B. Each of the second inverted corners 234 extends down the respective lateral profile protrusion 38, 40 of the shell assembly 14 to form a substantially linear front surface 238 before curving to form the upper surface 120 of the armrest 50, 52. The periphery of the profile includes a beveled outer edge 242 (FIG. 5B) that extends from the top surface 220 and front surfaces 224, 226 to the back panel 34. The cushioning 84 disposed on the headrest 72 and seatback 22 may be extended to the front surfaces 224, 226, 238 of the headrest wings 74, 76 and lateral profile protrusion 38, 40 or the cushioning 84 may maintain the shape of a low profile embodiment, as shown in FIG. 5A.

Figure 6A:
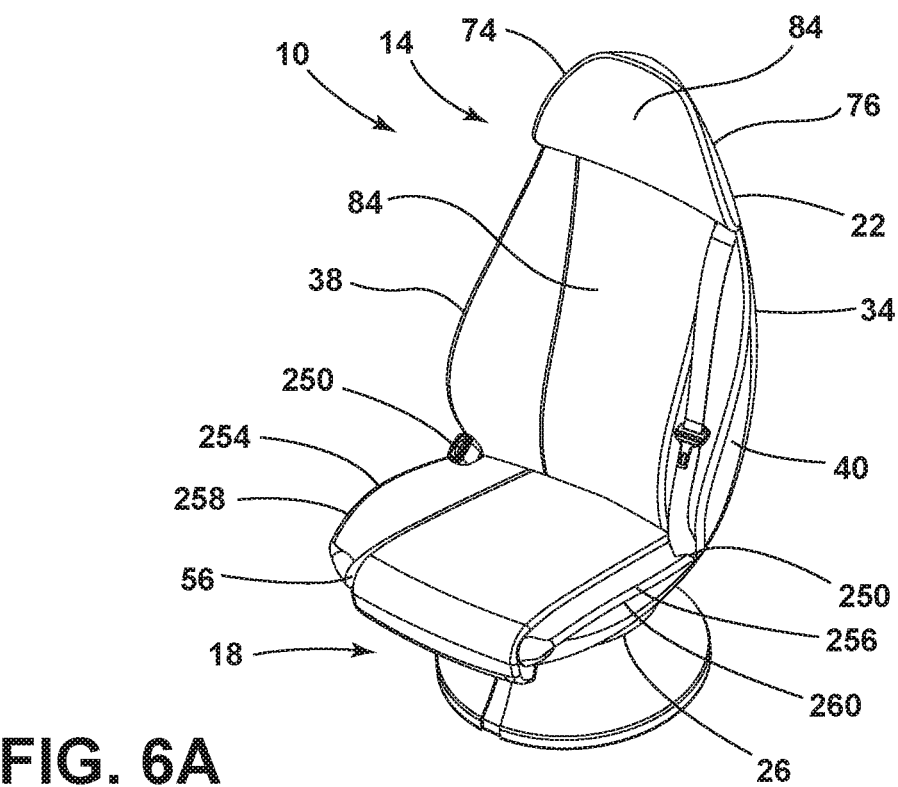
FIG. 6A is a side perspective view of an embodiment of a low profile seating assembly without an armrest.
Figure 6B:
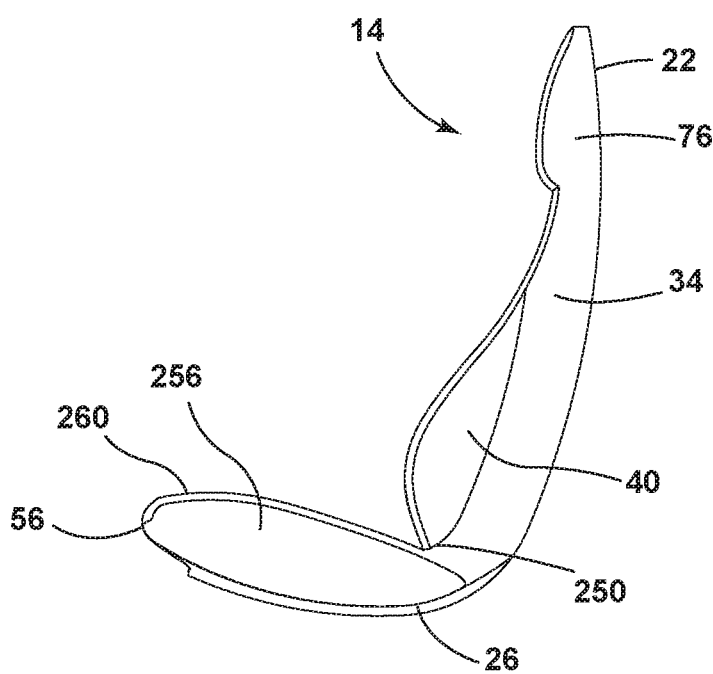
FIG. 6B is a side elevational view of a shell assembly of the low profile seating assembly without an armrest of FIG. 6A.

Referring now to FIGS. 6A and 6B, a low profile design for the shell assembly 14 free of armrests. Each of the lateral profile protrusions 38, 40 extends down in a bell-shape that wraps back to a joint 250 of the seatback 22 and seat base 26. From the joint 250, a lateral seat base edge 254, 256 extends forwardly to the front edge 56 of the seat base 26. The lateral seat base edges 254, 256 are angled upward and include an outer edge 258, 260 that extends from the back panel 34. The cushioning 84 may extend to the outer edges of the shell assembly 14 or, alternatively, the cushioning 84 may extend partially to the edges of the shell assembly 14, depending on the configuration of the seating assembly 10.

Figure 7:
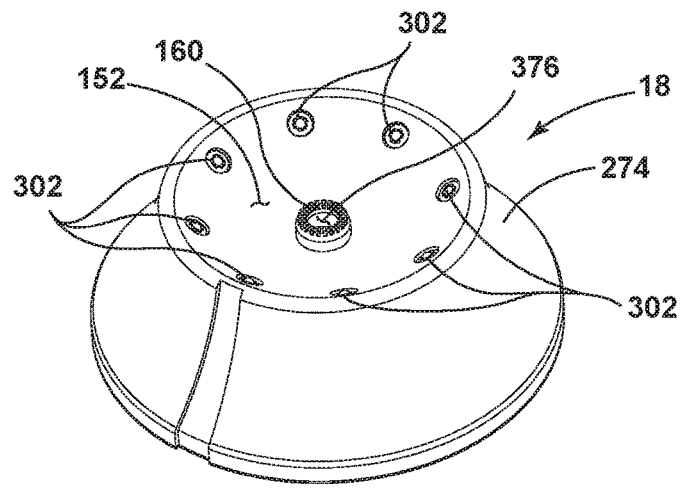
FIG. 7 is a side perspective view of a base assembly of the present disclosure.
Figure 8:
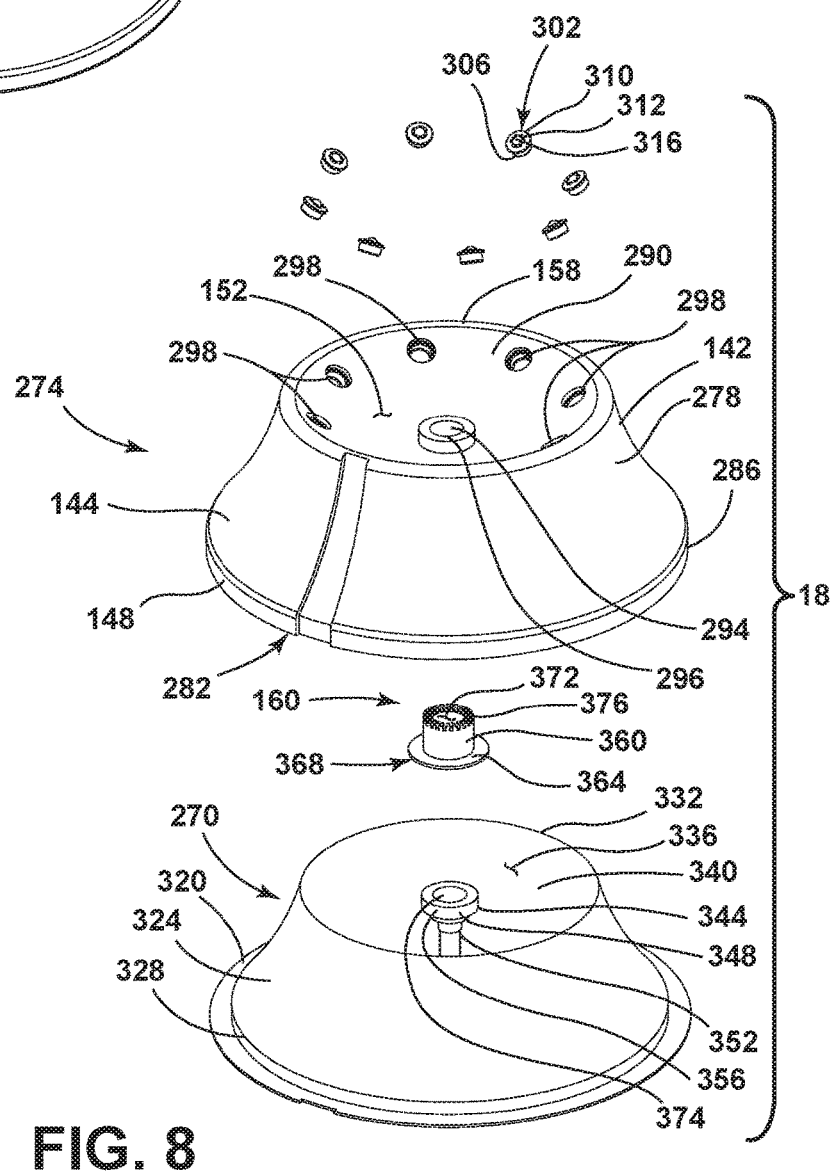
FIG. 8 is an exploded side perspective view of the base assembly of FIG. 7.

As shown in FIGS. 1A-1C, the seating assembly 10 consists of the base assembly 18 and the shell assembly 14. FIGS. 7 and 8 show the base assembly 18 assembled (FIG. 7) and with the various pieces of the base assembly 18 exploded away from one another (FIG. 8). As shown in FIG. 8, the base assembly 18 includes an inner base shell 270 and an outer base shell 274. Both the inner base shell 270 and the outer base shell 274 may be formed of some type of molded composite materials. The outer base shell 274 includes the lower portion 144 having a first diameter and the upper portion 142 having a second diameter. The first diameter is greater than the second diameter to form an at least partially frustoconical outer base shell 274 with a lateral surface 278, wherein the lateral surface 278 defines an interior receptacle 282 for the inner base shell 270. The lateral surface 278 of the outer base shell 274 is non-linear and extends downward from the upper portion 142 to a top 286 of the lip 148 of the lower portion 144. The lip 148 extends around the periphery of the lower portion 144 and may extend some distance vertically downward. The upper portion 142 includes the rim 158 that defines the periphery of the first recess 152 that extends some distance into the outer base shell 274. The first recess 152 is further defined by a first spherical surface 290. The first spherical surface 290 also defines a circular outer base shell opening 294 surrounded by a lip 296. Apertures 298 are also defined by the first spherical surface 290 at a specific distance below the rim 158. Each aperture 298 may be disposed such that the aperture 298 laterally opposes another aperture 298 and is further operably coupled to a ball bearing inserts 302 with a cylindrical body 306 of the same diameter as the aperture 298. Each ball bearing insert 302 may include a rim 310 surrounding the cylindrical body 306 and defining a cavity 312. A ball 316 is operably coupled to each rim 310 and is disposed within each cavity 312. It is contemplated that other configurations of rolling connectors may be used in place of the laterally opposing ball bearings without departing from the scope of the current disclosure.

Still referring to FIG. 8, the inner base shell 270 includes a circular base lip 320 extending some distance from a non-linear lateral surface 324 so that the outer diameter of the base lip 320 may be generally equivalent to the first diameter of the outer base shell 274. The non-linear lateral surface 324 extends from an interior edge 328 of the base lip 320 upward to an upper edge 332 of a recess 336. The diameter of the upper edge 332 may be generally equivalent to the second diameter of the outer base shell 274. The second recess 336 is defined by the upper edge 332 and a second generally spherical surface 340 and may be deeper than the first recess 152. An attachment post 344 extends upward from the center of the second spherical surface 340. In the illustrated embodiment of FIG. 8, the attachment post 344 is at least partially cylindrical and may include a top portion 348 and a base post 352 extending downward from the top portion 348. The top portion 348 includes a lateral edge 356, and the diameter of the top portion 348 may be generally equivalent to the diameter of the outer base shell opening 294 defined by the first spherical surface 290 of the outer base shell 274. The top portion 348 and some portion of the base 352 extends through the outer base shell opening 294 so that the top portion 348 is disposed within the center of the first recess 152.

Referring still to FIG. 8, the top portion 348 of the attachment post 344 is coupled to the spindle gear 160. The spindle gear 160 is generally cylindrical with a first portion 360 extending upward from a second portion 364. The second portion 364 may have a greater diameter than the first portion 360. The spindle gear 160 defines a first spindle gear opening 368 extending through the center of the second portion 364 and some distance through the first portion 360. The first spindle gear opening 368 allows the spindle gear 160 to operably couple to the attachment post 344 and may have a diameter generally equivalent to the diameter of the top portion 348 of the attachment post 344. The spindle gear 160 is disposed on the top portion 348 of the attachment post 344 and the attachment post 344 extends through the first spindle gear opening 368. The spindle gear 160 further defines a second spindle gear opening 372 within the top of the first portion 360 of the spindle gear 160 having a smaller diameter than the first spindle gear opening 368. The second spindle gear opening 372 is operably coupled to a cylindrical attachment post opening 374 of the same diameter extending through the attachment post 344. Twenty-two gear teeth 376 are disposed around a top edge 380 of the second spindle gear opening 372, corresponding to the twenty-two positions the shell assembly 14 may be rotated into. However, it is contemplated that the number of gear teeth 376 may deviate from the exemplary number shown in FIGS. 7 and 8 without departing from the scope of the present disclosure.

Figure 9:
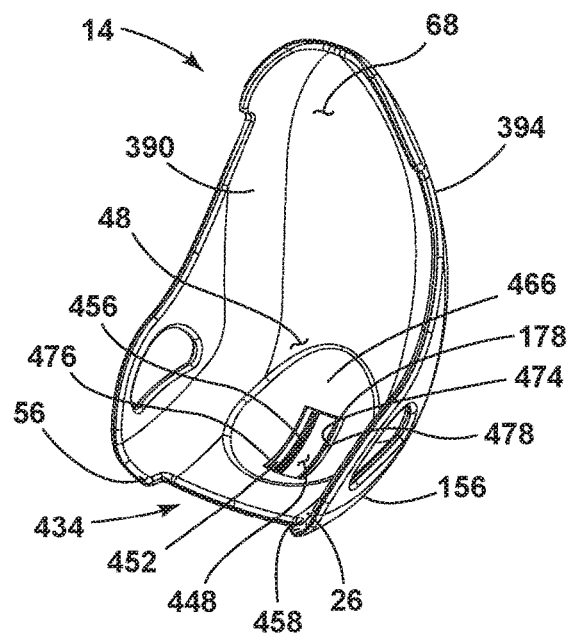
FIG. 9 is a side perspective view of a shell assembly of the present disclosure.
Figure 10:
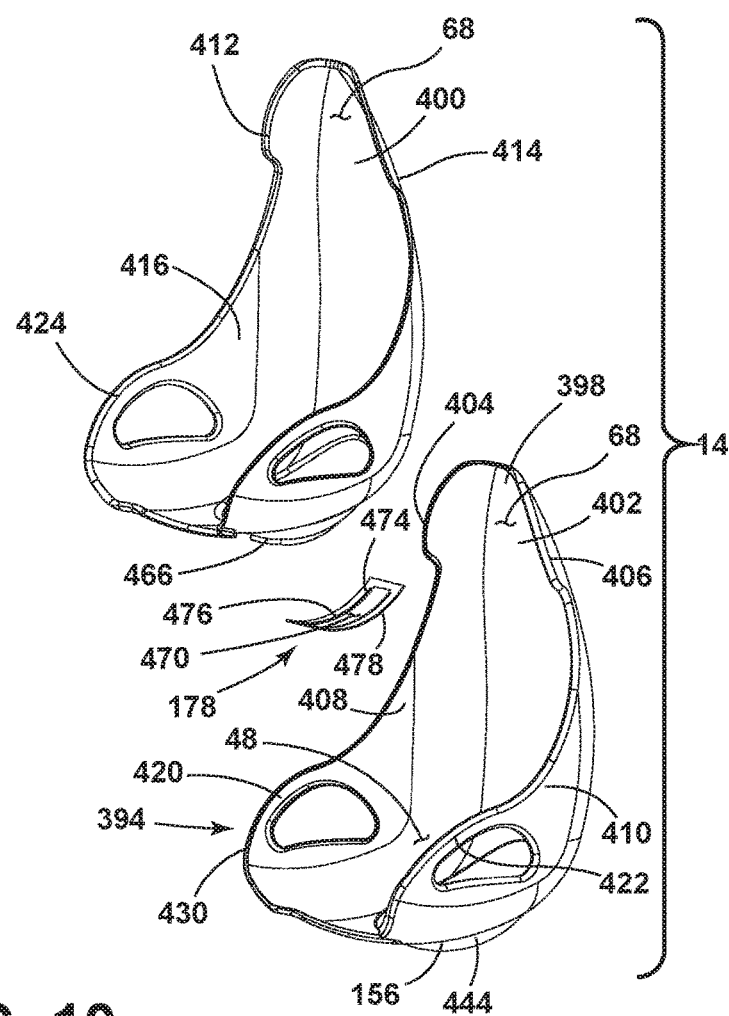
FIG. 10 is an exploded side perspective view of the shell assembly of FIG. 9.

Referring now to FIGS. 9 and 10, a shell assembly 14 is shown assembled (FIG. 9) and with the various components exploded away from one another (FIG. 10). The shell assembly 14 includes an inner shell 390 and an outer shell 394 configured so that the inner shell 390 nests against a top surface 398 (FIG. 10) of the outer shell 394. Both the inner shell 390 and the outer shell 394 are at least partially ovoid in shape with the headspace 68 having a smaller diameter than the hip space 48, as discussed in further detail herein. As shown in FIG. 10, the outer shell 394 and the inner shell 390 each forms a single panel 400, 402. Both the single panel 400 of the inner shell 390 and the single panel 402 of the outer shell 394 may be formed of some type of molded composite material. The panel 402 of the outer shell 394 includes exterior headrest wings 404, 406 and exterior lateral profile protrusions 408, 410 that extend some distance further than interior headrest wings 412, 414 and interior lateral profile protrusions 416, 418 of the inner shell 390. The outer shell 394 further defines exterior armrests 420, 422 while the inner shell 390 defines interior armrests 424, 426. The interior headrest wings 412, 414, the interior lateral profile protrusions 416, 418, and the interior armrests 424, 426, along with the rest of the inner shell 390, fit within an outer edge 430 of the outer shell 394 and align with the corresponding exterior portions. As shown in FIG. 9, the inner shell 390 and outer shell 394 may also together define a cutout 434 at the front edge 56 of the seat base 26. The cut out 394 may allow the middle seat base cushion 104 to include the bolster 110, as shown in FIGS. 1A-1C.

Still referring to FIGS. 9 and 10, the outer shell 394 includes the rounded bottom 156, as disclosed in further detail herein. The rounded bottom 156 is hollow with a spherical bottom surface 440. As shown in FIG. 1C, the rounded bottom 156 is shaped so that the diameter of the bottom allows the rounded bottom 156 to nest within the recess 152 of the outer base shell 274. The rounded bottom 156 is disposed on the ball bearing inserts 302 which facilitate movement of the rounded bottom 156 within the recess 152 to adjust the position of the shell assembly 14. Referring back to FIG. 9, the rounded bottom 156 further defines a rectangular interface aperture 448 extending some distance along a fore/aft centerline of the rounded bottom 156. The rectangular interface aperture 448 includes a rectangular lip 452 extending some distance from first and second lateral sides 456, 458 of the rectangular interface aperture 448 and corresponding to the outer dimensions of a rectangular arched gear plate 178. The inner shell 390 also includes a non-linear inner shell bottom 466 (FIG. 10) configured to nest within the outer shell 394 so that the inner shell bottom 466 is substantially flush with the spherical bottom surface 440 of the outer shell 394. The inner shell bottom 466 of the inner shell 390 also defines the rectangular interface aperture 448 defined by the outer shell 394. When the inner shell 390 is nested with the outer shell 394, the gear plate 178 is secured between the inner shell 390 and outer shell 394 and may be made of steel sufficient to support the movement of the shell assembly 14 relative to the base assembly 18. The gear plate 178 may further define a slot 470 that may have different dimensions but is similar in shape to the rectangular interface aperture 448 defined by the outer shell 394 and the inner shell 390. The slot 470 defined by the gear plate 178 further includes twenty-five gear teeth 474 disposed on first and second lateral edges 476, 478 of the gear plate 178. However, it is contemplated that the number of gear teeth 474 may deviate from the exemplary number shown in FIGS. 9 and 10 without departing from the scope of the present disclosure.

Figure 13:
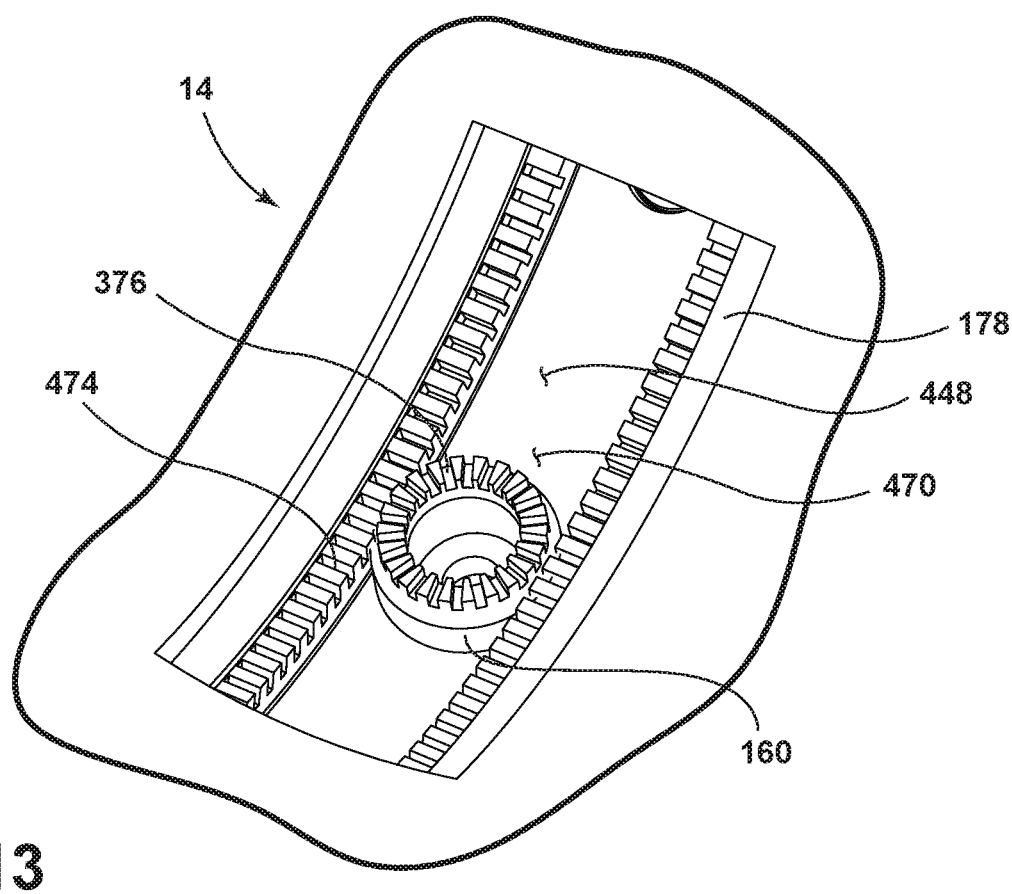
FIG. 13 is a top perspective view of a gear plate operably coupled with a spindle gear.

Referring now to FIGS. 11 and 12, a control assembly 500 is shown both assembled (FIG. 12) and with the various pieces of the control assembly 500 exploded away from each other (FIG. 13). The control assembly 500 includes a bolt 504 extending upward through a washer 508, a sleeve 512, and a guide shoe retainer 516 and further operably coupled to a weld nut 520. The guide shoe retainer 516 is further coupled to a guide shoe plate 524 defining laterally opposing slots 522, 526. The locking key 528 extends through the slots 522, 526 and is coupled to the locking leaf spring 532 configured to actuate the locking key 528. The control assembly 500 also includes a housing 536 that includes a lip 540 coupled to the guide shoe retainer 516 to encase the locking key 528 and locking leaf spring 532. Further coupled to the locking key 528 and extending through the housing 536 is an actuator 544 coupled to an operator or handle 80 disposed proximate the seating assembly 10.

Referring now to FIG. 13, the gear plate 178 is shown disposed within the rectangular interface aperture 448 defined by the shell assembly 14. The gear plate 178 frames the slot 470, and the slot 470 is of a width equivalent to the diameter of the spindle gear 160. The spindle gear 160 may extend upward so that the gear teeth 376 of the spindle gear 160 are positioned higher than the gear teeth 474 of the gear plate 178. The spindle gear 160 may be operably coupled to the gear plate 178 and disposed within the slot 470 so that the gear plate 178 may slide forward and backward as allowed by the length of the arch of the gear plate 178. The spindle gear 160 is further positioned so that the gear plate 178 may rotate around the spindle gear 160 as the shell assembly 14 is rotated. As either the spindle gear 160 slides or the gear plate 178 rotates, the gear teeth 376 of the spindle gear 160 consistent align so that at least two opposing gear teeth 376 are positioned in line with the gear teeth 474 of the gear plate 178.

Figure 14:
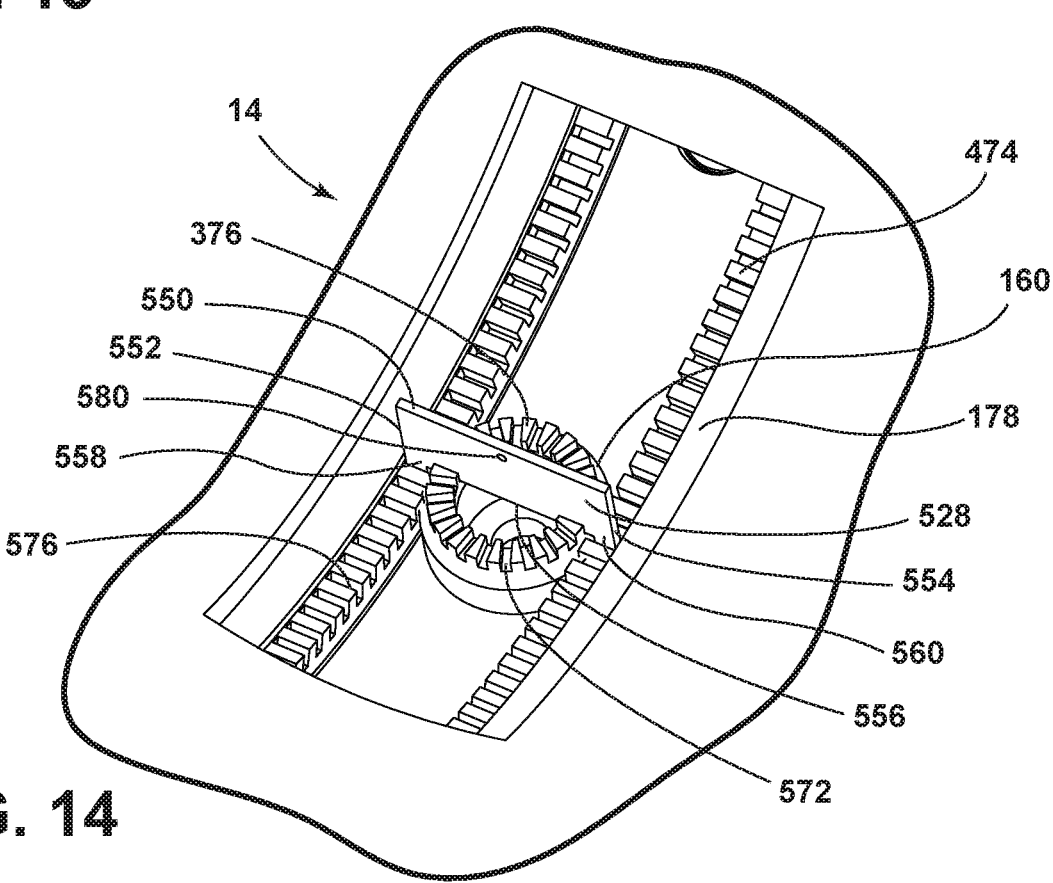
FIG. 14 is a top perspective view of the gear plate and the spindle gear of FIG. 13 operably coupled with a locking key.

Referring now to FIGS. 12 and 14, the locking key 528 simultaneously engages with both the spindle gear 160 and the gear plate 178. A connection aperture 580 is defined by the locking key 528 and is disposed near the top of the locking key 528. The locking key 528 is generally rectangular and includes a top edge 550, two opposing lateral edges 552, 554, and a bottom edge 556. The bottom edge 556 includes two linear protrusions 558, 560. Together, the bottom edge 556 and the two linear protrusions 558, 560 define a rectangular indention 564 that extends some distance upward. The linear protrusions 558, 560 each include a bottom surface 568 (FIG. 12) that may be disposed on a base surface 572 of the gear teeth 474 of the gear plate 178 when the locking key 528 is fully engaged with the gear plate 178. In the same way, the bottom edge 556 of the locking key 528 may be disposed on the base surface 572 of the gear teeth 376 of the spindle gear 160 when the locking key 528 is engaged with the spindle gear 160. The distance the indention 564 extends is determined by the height of the base surface 572 of the gear teeth 376 of the spindle gear 160 relative to the height of a base surface 576 of the gear teeth 474 of the gear plate 178 and may vary depending on the configuration of the gear plate 178 and the spindle gear 160.

Figure 15:
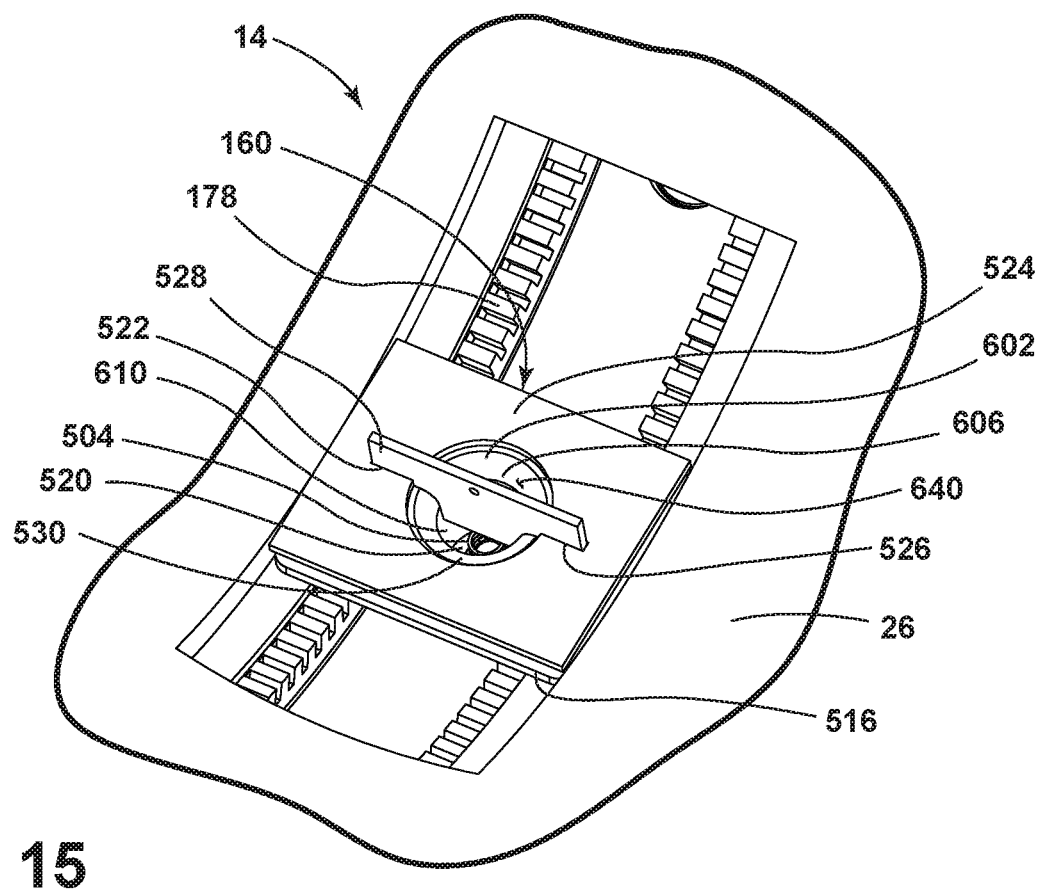
FIG. 15 is a top perspective view of the gear plate and the spindle of FIG. 13 gear operably coupled with a locking key and a guide shoe retainer.

Referring now to FIG. 15, the locking key 528 is shown fully engaged with the spindle gear 160 and gear plate 178. The guide shoe retainer 516 and the guide shoe plate 524 are coupled to the locking key 528. As shown in FIG. 12, the guide shoe retainer 516 includes an upper cylindrical portion 590, a lower cylindrical portion 594, and an upwardly curved rectangular edge 598. The upper cylindrical portion 590 includes a raised surface 602 defining a channel 606 to encase the gear teeth 376 of the spindle gear 160. The channel 606 is disposed around an upper opening 610 defined by the raised surface 602 of the upper cylindrical portion 590, and the raised surface 602 extends downward to join with the lower cylindrical portion 594. The raised surface 602 and the lower cylindrical portion 594 continue to define the upper opening 610 through the lower cylindrical portion 594 of the guide shoe retainer 516. The diameter of the lower cylindrical portion 594 of the guide shoe retainer 516 may be generally the same diameter as the second spindle gear opening 372 defined by the spindle gear 160 so that the lower cylindrical portion 594 can couple to the second spindle gear opening 372, as shown in FIG. 15. FIG. 11 also shows the upper cylindrical portion 590 including a lip 614 around the bottom of the periphery of the channel 606. A slot 618 is defined by the rectangular edge 598 of the guide shoe retainer 516, the raised surface 602, and the lip 614 to allow the locking key 528 to extend through the guide shoe retainer 516 to engage with the spindle gear 160 and the gear plate 178, as shown in FIG. 15. The lower cylindrical portion 594 of the guide shoe retainer 516 includes a bottom surface 622. The bottom surface 622 defines a receiving well 626 in the center of the bottom surface 622. The bottom surface 622 may be flush with the sleeve 512 having a similar diameter to the receiving well 626 (FIG. 12). The sleeve 512 receives the bolt 504 so that the bolt 504 extends through the receiving well 626 and the upper opening 610 of the guide shoe retainer 516 and is secured by the weld nut 520. The weld nut 520 is positioned flush against an interior surface 630 of the bottom surface 622 of the lower cylindrical portion 594 of the guide shoe retainer 516 (FIG. 16) when fully engaged with the bolt 504. A head 634 of the bolt 504 may be separated from the guide shoe retainer 516 by the washer 508 (FIG. 13) when the bolt 504 to secure the guide shoe retainer 516 to the spindle gear 160.

Still referring to FIG. 15, the rectangular guide shoe plate 524 sits flush against the raised surface 602 of the upper cylindrical portion 590 of the guide shoe retainer 516. The guide shoe plate 524 is coupled to the guide shoe retainer 516 and defines a plate opening 640 with a diameter sufficient to allow the channel 606 and raised surface 602 to extend some distance through the plate opening 640 or, alternatively, to sit flush with the guide shoe plate 524. The guide shoe plate 524 further defines two laterally opposing slots 522, 526 extending from the plate opening 640 and aligned with the slot 618 defined the guide shoe retainer 516. The locking key 528 may be disposed within these slots 522, 526 such that the linear protrusions 558, 560 of the locking key 528 are secured within the slots 522, 526.

Figure 16:
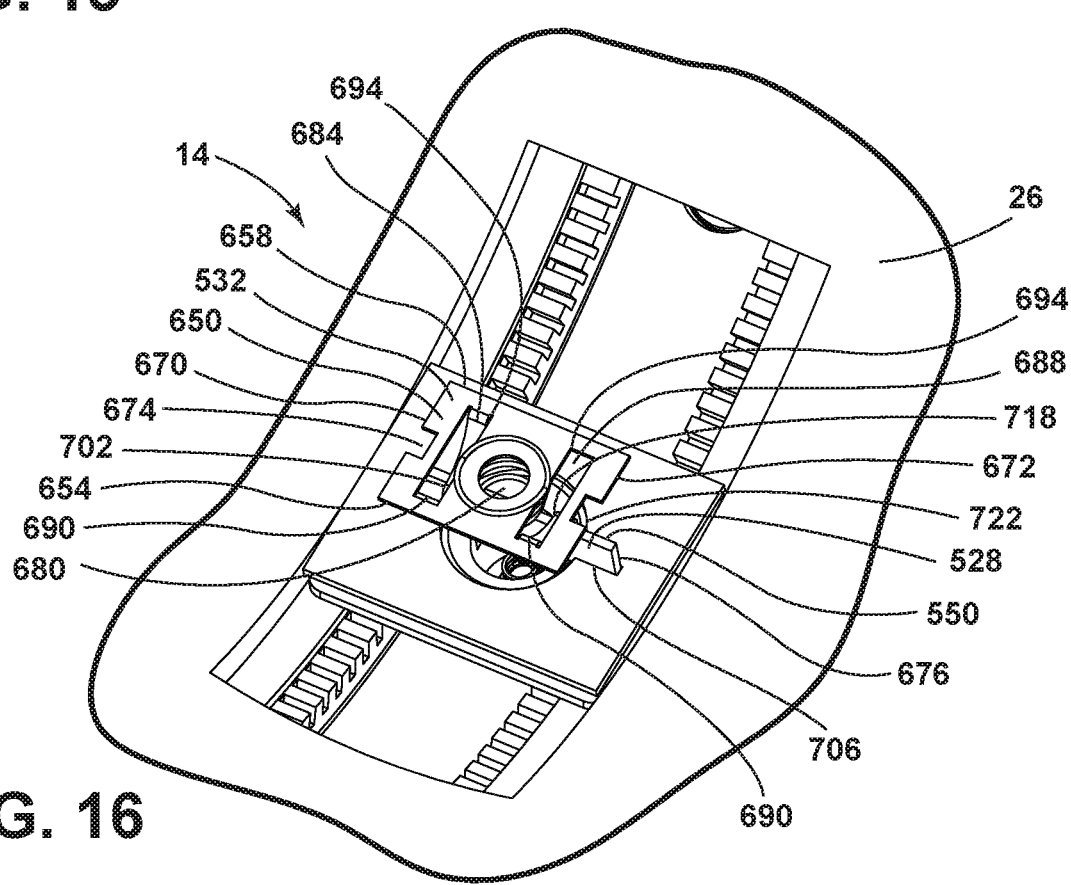
FIG. 16 is a top perspective view of the gear plate and the spindle gear of FIG. 13 operably coupled with a locking key, a guide shoe retainer, and a locking leaf spring.

Referring now to FIG. 16, the locking leaf spring 532 is coupled to the locking key 528 to bias the locking key 528 between an engaged position, an intermediate position, and a released position. The locking leaf spring 532 includes a rectangular plate 650 of smaller dimensions than the guide shoe plate 524. The rectangular plate 650 includes a front edge 654, a back edge 658, and two laterally opposing side edges 670, 672. Two rectangular niches 674, 676 are defined inward of each of the laterally opposing side edges 670, 672. Centered between the two niches 674, 676, the rectangular plate 650 defines a circular space 680. The circular space 680 is centered over the aligned openings 640, 610, 372, 374 of the guide shoe plate 524, the guide shoe retainer 516, the spindle gear 160, and the attachment post 344. Disposed between the circular space 680 and the niches 674, 676, the plate 650 defines two rectangular cutouts 684, 688. Each cutout 684, 688 is further defined by a front edge 690 and a back edge 694. As shown in FIG. 12, on the first cutout 684, a first non-linear arm 698 extends from the back edge 694 to a first vertical foot 702 configured to engage the top edge 550 and a front surface 706 of the locking key 528 to form a first tension spring 710. Similarly, on the second cutout 688, a non-linear arm 714 extends from the front edge 690 to a second vertical foot 718 configured to engage the top edge 550 and a back surface 722 of the locking key 528 to form a second tension spring 726. The opposing tension springs 710, 726 may bias the locking key 528 in an engaged position. It is contemplated that the locking key 528 may alternatively be controlled by other springs, such as a tension helical spring or a conical spring without departing from the scope of the present disclosure.

Figure 17:
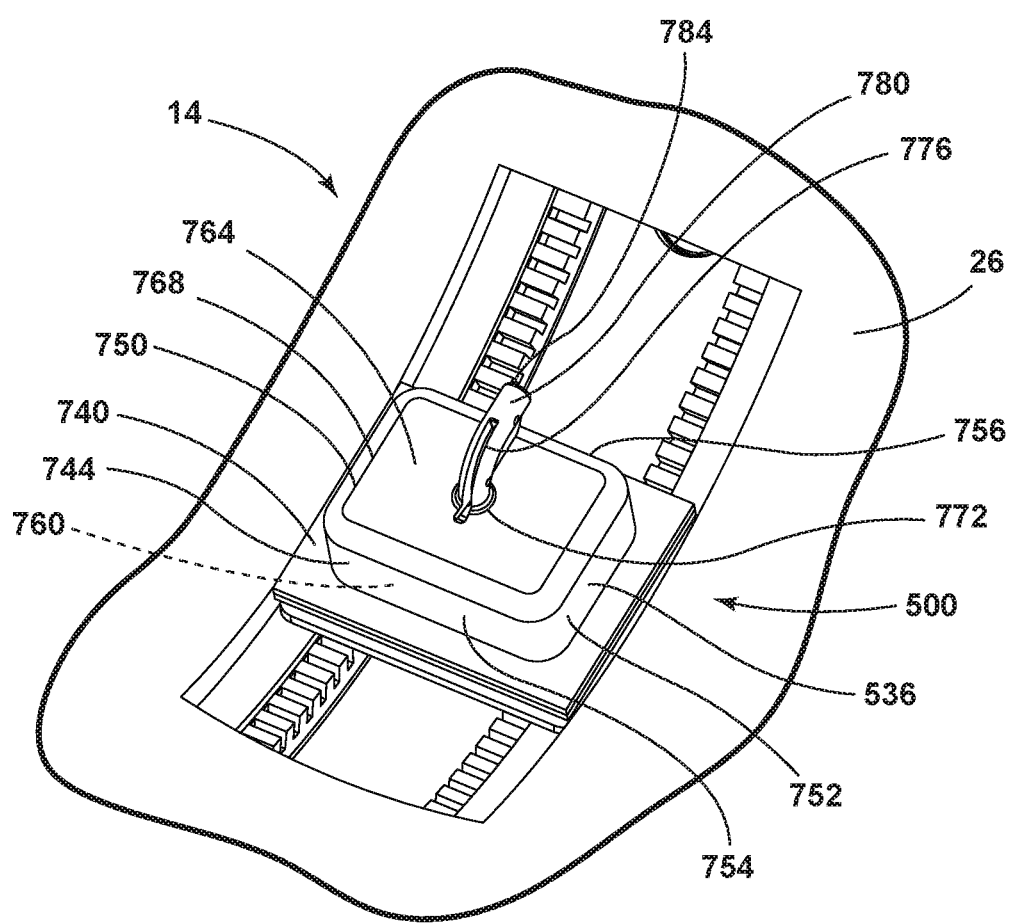
FIG. 17 is a top perspective view of the gear plate and the spindle gear of FIG. 13 operably coupled with a locking key, a guide shoe retainer, a locking leaf spring, and a housing.

Referring now to FIG. 17, the control assembly 500 is shown fully assembled and covered with the housing 536. The housing 536 includes an edge 740 of the same dimensions as the guide shoe retainer 516 and guide shoe plate 524. Extending upward from the edge 740 is a perimeter wall 744 where first and second sidewalls 750, 752 are joined by a front wall 754 and a back wall 756. The perimeter wall 744 defines a compartment 760 within the housing 536. The locking leaf spring 532 and the locking key 528 may be disposed within the compartment 760 and covered with a top surface 764 of the housing 536. The top surface 764 includes beveled edges 768 where it joins the perimeter wall 744. In the center of the top surface 764, the housing 536 defines an aperture 772. A tube 776 connects around the aperture 772 and extends upward some distance. A top end 780 of the tube 776 forms a receiving well 784 through which an actuator 544 (FIG. 12) extends to operably couple to the locking key 528 and/or the locking leaf spring 532. The actuator 544 further extends through the circular space 680 of the locking leaf spring 532 and is operably coupled to the connection aperture 580 defined by the locking key 528. This allows the operator 80 to control the height of the locking key 528 by using the actuator 544 to pull against the bias created by the locking leaf spring 532 and the two tension springs 710, 726. It is contemplated that the actuator 544 may be coupled to another type of operator 80, as opposed to a handle, such as, for example, a switch, a lever, or a button, without departing from the scope of the present disclosure.

Figure 18A:
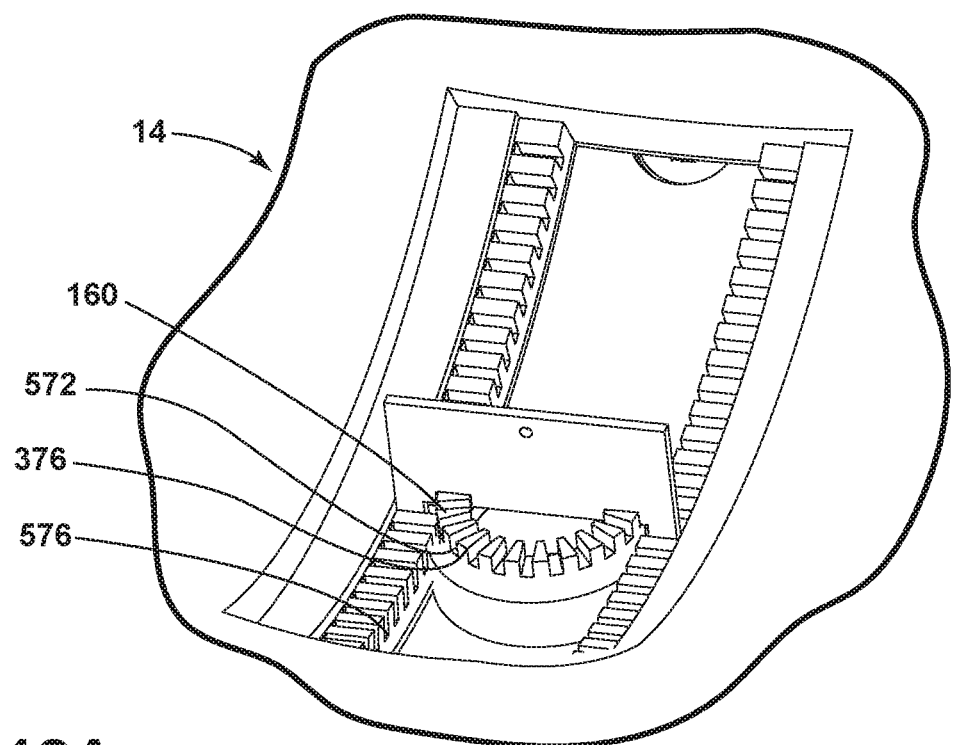
FIG. 18A is a top perspective view of a gear plate and a spindle gear operably coupled with the locking key in an engaged position.
Figure 18B:
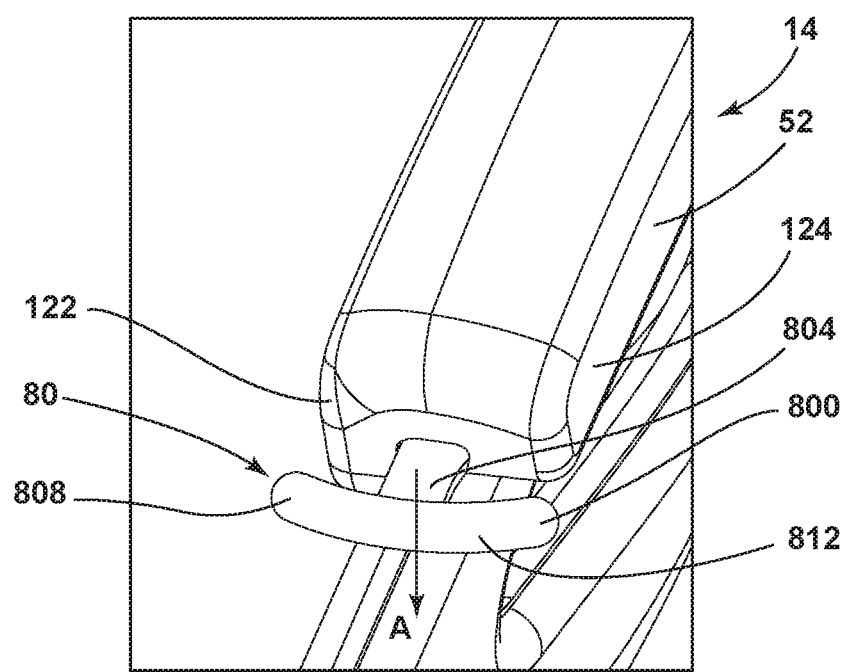
FIG. 18B is a top perspective view of a handle of the present disclosure in a first position corresponding to the engaged position of the locking key.
Figure 19A:
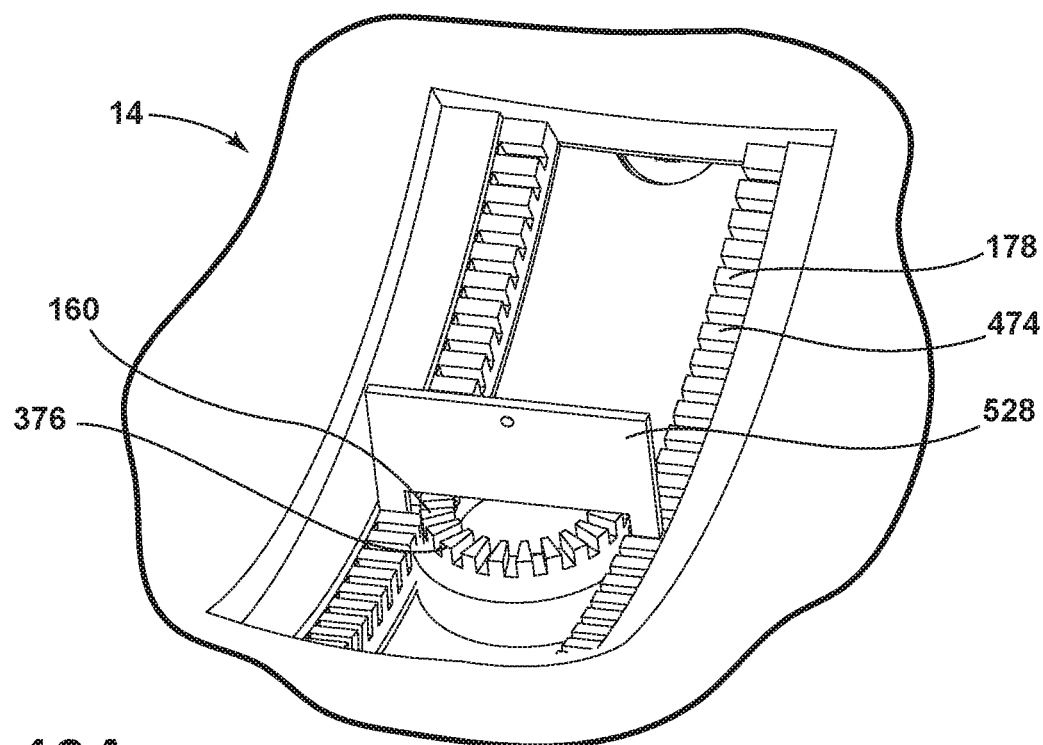
FIG. 19A is a top perspective view of the gear plate and the spindle gear operably coupled with the locking key in an intermediate position.
Figure 19B:
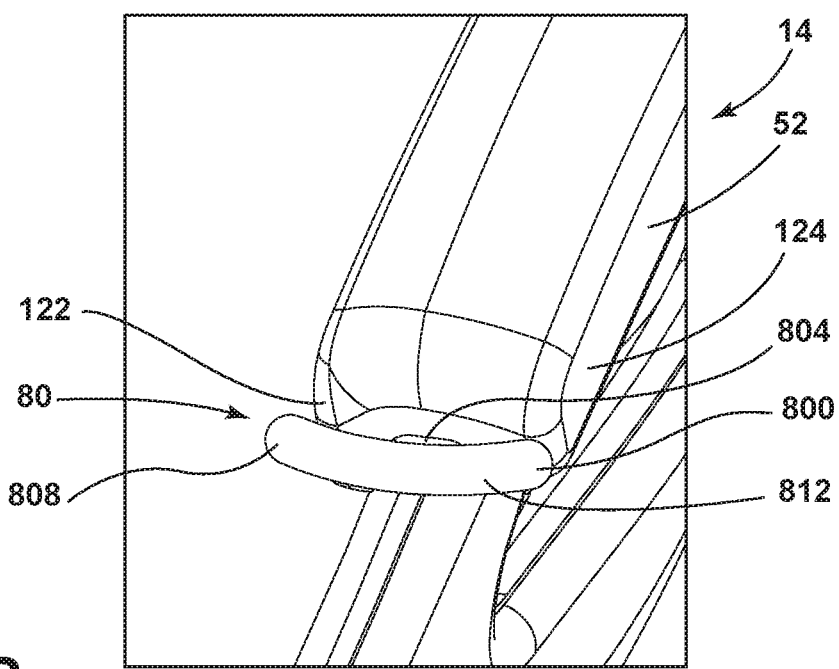
FIG. 19B is a top perspective view of the handle of the present disclosure in a second position corresponding to an intermediate position of a locking key.
Figure 20A:
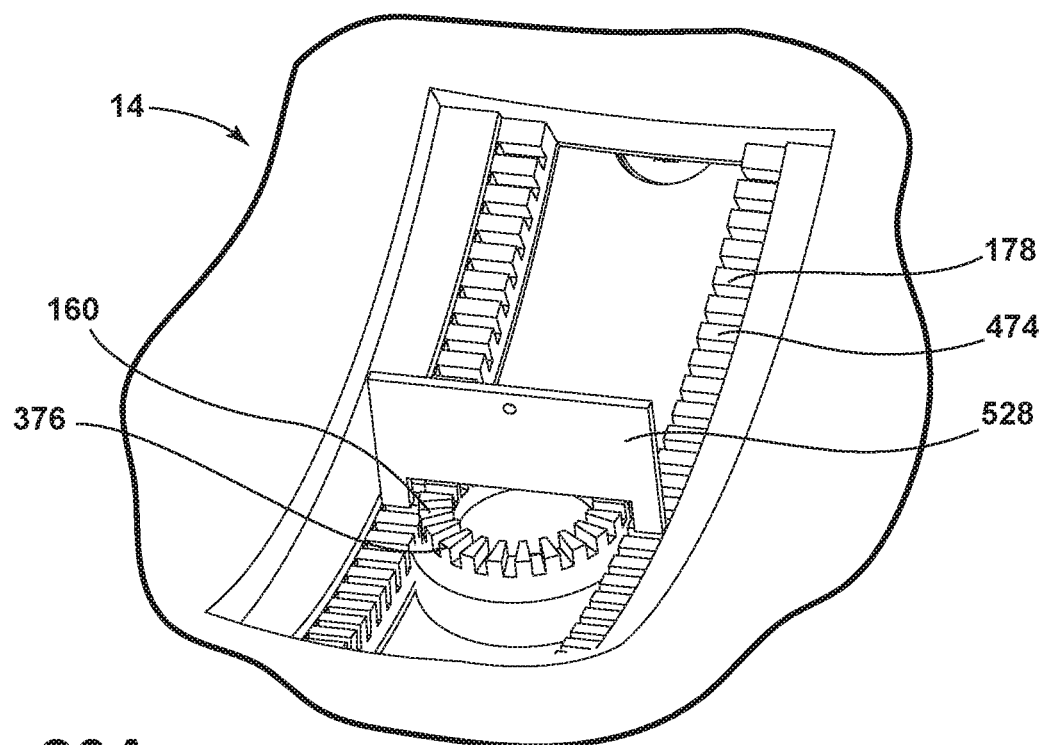
FIG. 20A is a top perspective view of the gear plate and the spindle gear operably coupled with the locking key in a released position.
Figure 20B:
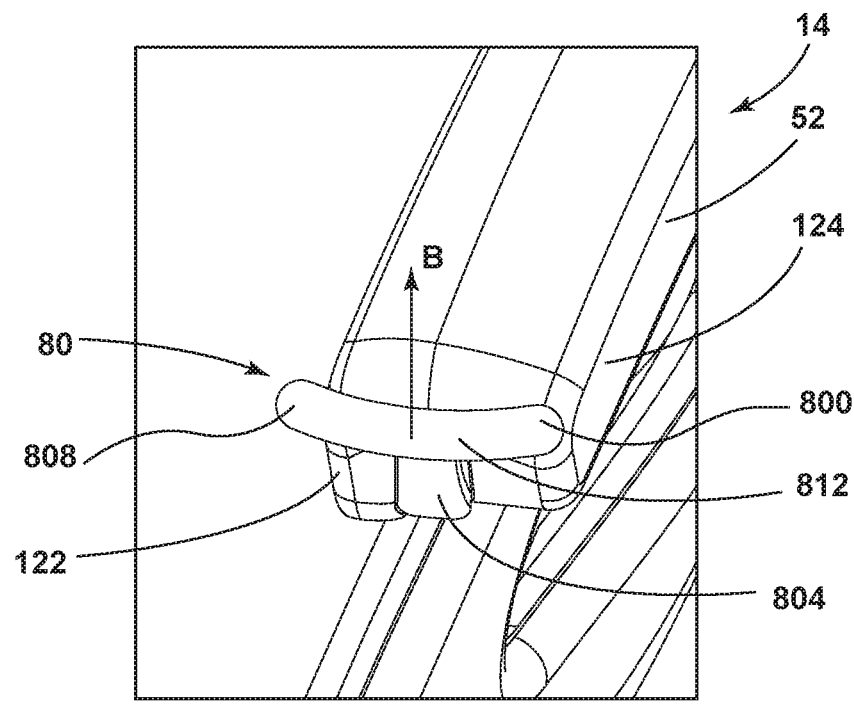
FIG. 20B is a top perspective view of the handle of the present disclosure in a third position corresponding to the released position of the locking key.

Referring now to FIGS. 18A-20B, the actuator 544 is shown coupled to the handle 80 disposed on the armrest 50, 52 of the shell assembly 14 (FIGS. 18B, 19B, and 20B). The handle 80 includes a non-linear grip 800 positioned at the front of the armrest 50, 52 and coupled to the armrest 50, 52 by an attachment arm 804 connected to the actuator 544 (FIG. 12). The handle 80 is disposed so that opposing ends 808, 812 of the grip 800 are aligned with the lateral surfaces 122, 124 of the armrest 50, 52. The handle 80 is movable between a first position (FIG. 18B), a second position (FIG. 19B), and a third position (FIG. 20B) and actuates the locking key 528 to selectively engage with one of the spindle gear 160 and the gear plate 178 and subsequently with the other of the spindle gear 160 and the gear plate 178. It is should be noted that the positions of the handle 80 and the corresponding positions of the locking key 528 as shown here are exemplary and may be reversed or altered without departing from the scope of the present disclosure.

As shown in FIG. 18B, the first position of the handle 80 includes pushing the handle 80 fully down along arrow A and corresponds with the locking key 528 in an engaged position. FIG. 18A shows the locking key 528 in the engaged position such that the locking key 528 is resting on both the base surface 572 of the gear teeth 376 of the spindle gear 160 and the base surface 576 of the gear teeth 474 of the gear plate 178. The shell assembly 14 is prevented from moving, either in a rotating direction or in a reclining direction while the locking key 528 is in the engaged position.

As shown in FIG. 19B, the second position of the handle 80 includes the handle 80 in an intermediate position and corresponds to the locking key 528 in an intermediate position. FIG. 19A shows the locking key 528 raised into the intermediate position such that the locking key 528 is no longer engaged with the gear teeth 376 of the spindle gear 160. When in the intermediate position, the locking key 528 remains engaged with the gear teeth 474 of the gear plate 178. The locking key 528 in the intermediate position prevents movement in a reclining direction while the shell assembly 14 is free to rotate about the spindle gear 160. It is contemplated that the order in which the spindle gear 160 and the gear plate 178 are released from the locking key 528 may alternate such that, when the locking key 528 is in the intermediate position, the locking key 528 is no longer engaged with the gear teeth 474 of the gear plate 178 and remains engaged with the gear teeth 376 of the spindle gear 160, allowing reclining movement of the shell assembly 14 while preventing the shell assembly 14 from rotating.

As shown in FIG. 20B, the third position of the handle 80 includes the handle 80 fully pulled upward along arrow B and corresponds with the locking key 528 in a released position. FIG. 20A shows the locking key 528 fully disengaged from both the gear teeth 376 of the spindle gear 160 and the gear teeth 474 of the gear plate 178. When the locking key 528 is in the released position, the shell assembly 14 is free to rotate about the spindle gear 160, and the shell assembly 14 is free to recline along a path allowed by the gear plate 178 and the control assembly 500. When the desired position is selected, including rotation and recline, the locking key 528 may be returned to the engaged position to secure the selection.

Figure 21A:
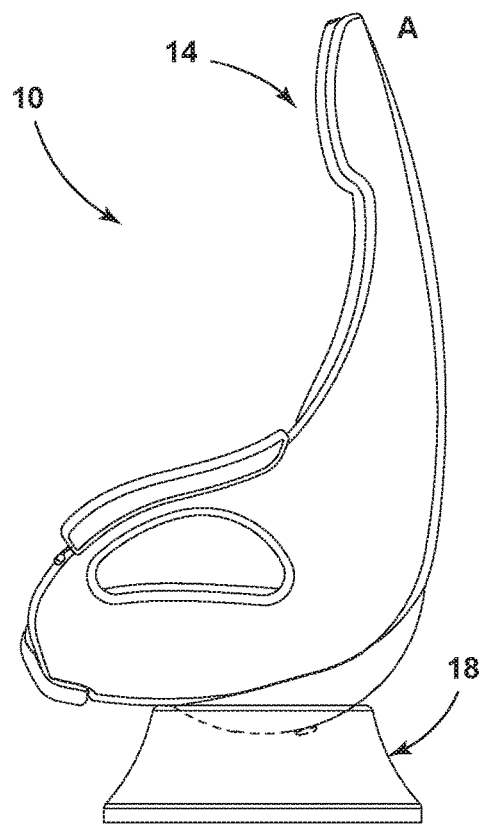
FIG. 21A is a side elevational view of a seating assembly of the present disclosure with the shell assembly in a forward position.
Figure 21B:
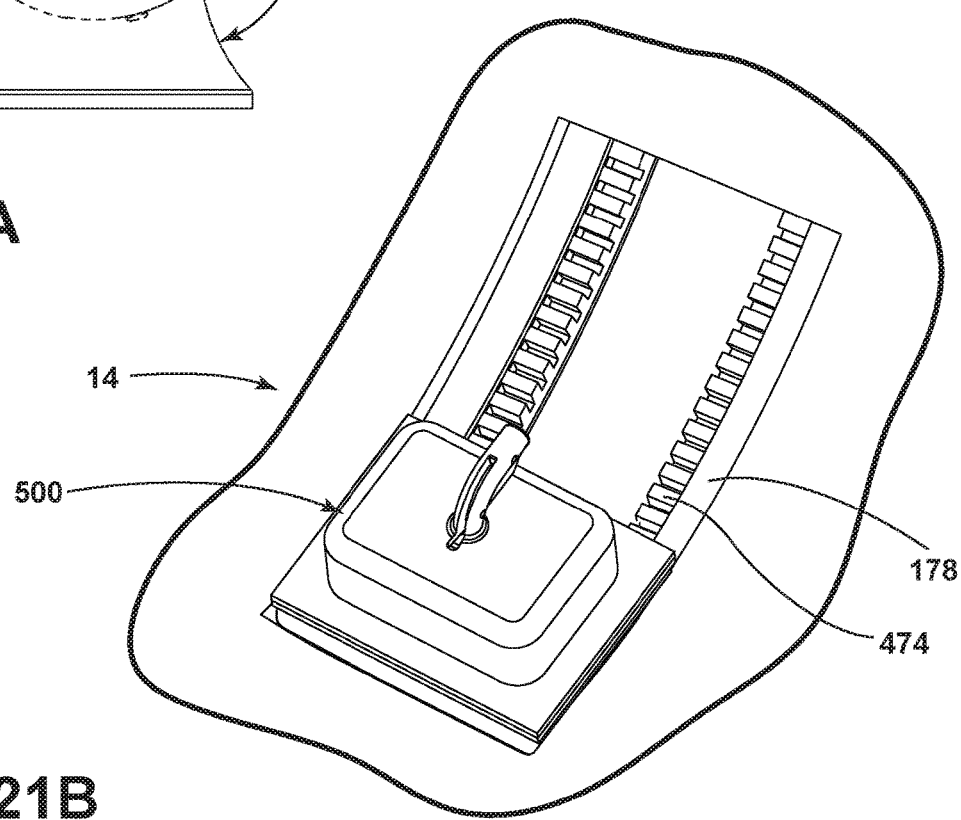
FIG. 21B is a top perspective view of a control assembly engaged with a gear plate and a spindle gear in a forward position corresponding to the forward position of the shell assembly of FIG. 21A.
Figure 22A:
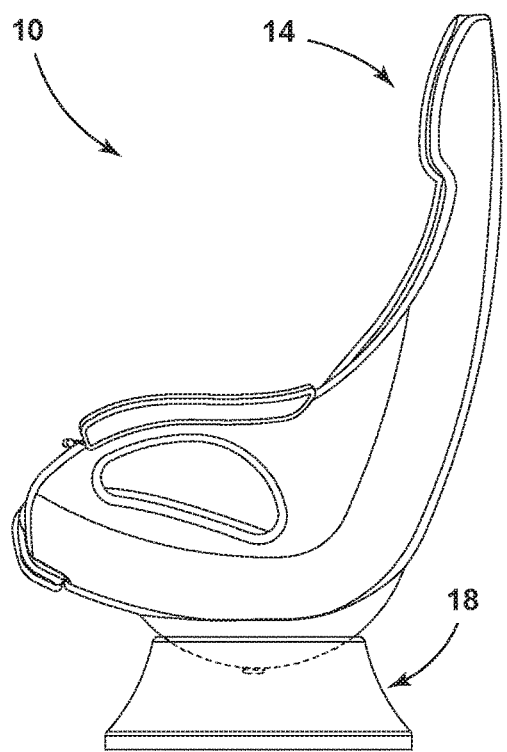
FIG. 22A is a side elevational view of the seating assembly with the shell assembly in an intermediate position.
Figure 22B:
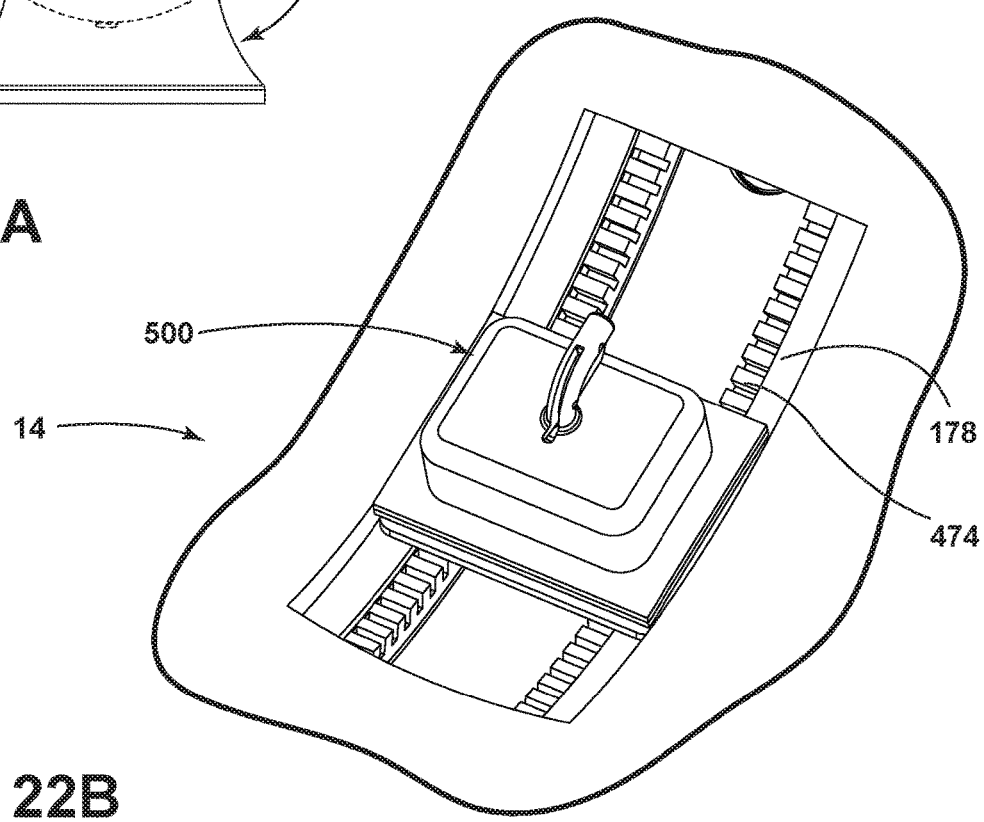
FIG. 22B is a top perspective view of a control assembly engaged with a gear plate and a spindle gear in the intermediate position corresponding to the intermediate position of the shell assembly of FIG. 22A.
Figure 23A:
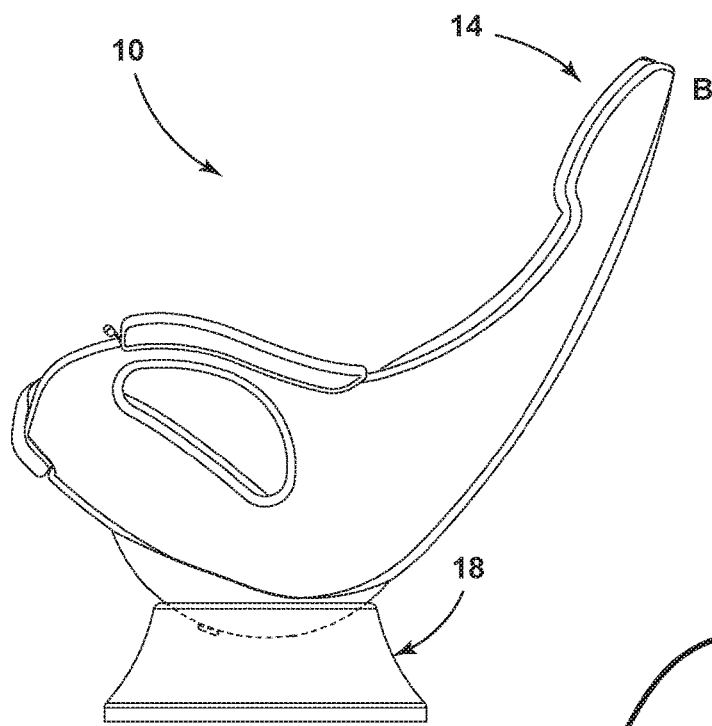
FIG. 23A is a side elevational view of a seating assembly with a shell assembly in a rearward position.
Figure 23B:
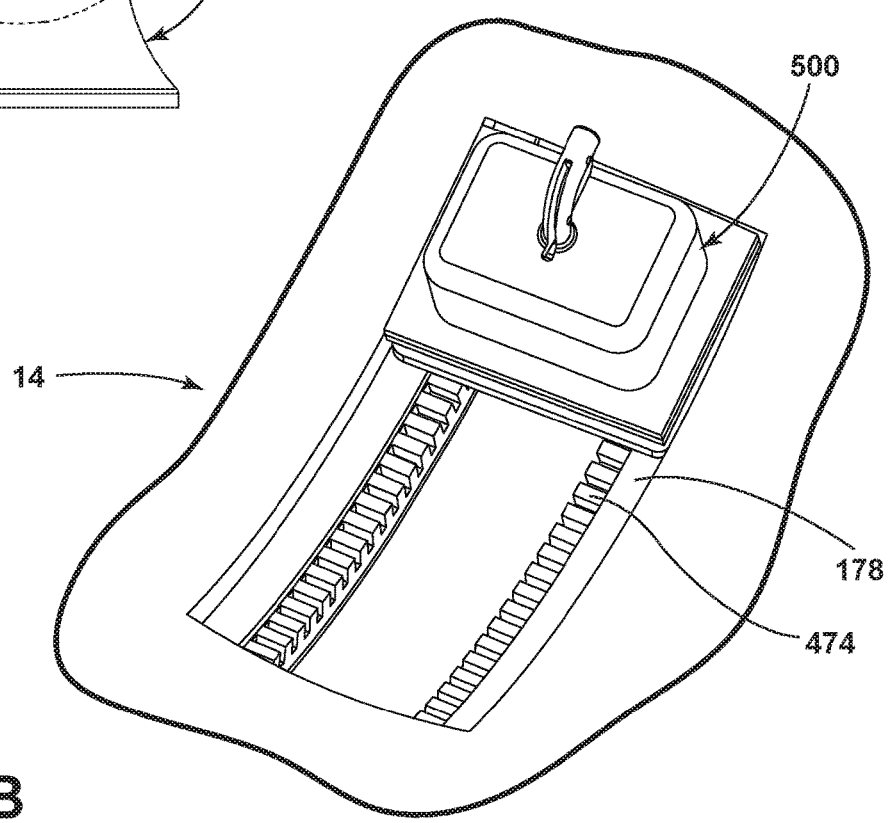
FIG. 23B is a top perspective view of a control assembly engaged with a gear plate and a spindle gear in the rearward position corresponding to the rearward position of the shell assembly of FIG. 23A.

Referring now to FIGS. 21A-23B, the control assembly 500 and shell assembly 14 are shown in three exemplary recline positions. As shown in FIG. 21A, the shell assembly 14 may be inclined forward to a first position A. FIG. 21B shows the location of the control assembly 500 when the shell assembly 14 is inclined to its front limit. When the shell assembly 14 is fully inclined forward, the control assembly 500 is engaged with the gear teeth 474 of the gear plate 178 that are located at the front of the gear plate 178. Likewise, as shown in FIG. 22A, the shell assembly 14 may be in a neutral and upright position. FIG. 22B shows the location of the control assembly 500 when the shell assembly 14 is upright and in a neutral position. When the shell assembly 14 is in an upright and neutral position, the control assembly 500 is engaged the gear teeth 474 of the gear plate 178 so that the control assembly 500 is located generally in the center of the gear plate 178. As shown in FIG. 23A, the shell assembly 14 may also be fully reclined to a position B. FIG. 23B shows the location of the control assembly 500 when the shell assembly 14 is reclined to its back limit. When the shell assembly 14 is fully reclined, the control assembly 500 is engaged the gear teeth 474 at the back of the gear plate 178. It will be understood that the shell assembly 14 may similarly slide to any position between these exemplary positions by engaging with one of the other pairs of gear teeth 474 disposed on the gear plate 178.

It will be understood by one having ordinary skill in the art that construction of the described concepts, and other components, is not limited to any specific material. Other exemplary embodiments of the concepts disclosed herein may be formed from a wide variety of materials unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A seating assembly comprising:
   a shell assembly;
   a base assembly operably coupled to the shell assembly; and
   a control assembly including a handle, comprising:
      a spindle gear positioned within the base assembly;
      a gear plate disposed in the shell assembly proximate the spindle gear;
      a locking key configured to simultaneously engage the spindle gear and the gear plate;
      a locking leaf spring configured to bias the locking key into engagement with the spindle gear and the gear plate; and
      an actuator configured to withdraw the locking key from engagement with one of the gear plate and spindle gear and subsequently withdraw the locking key from engagement with the other of the gear plate and spindle gear.

2. The seating assembly of claim 1, wherein the base assembly further comprises:
an outer base shell defining a recess; and
an inner base shell coupled to the spindle gear.

3. The seating assembly of claim 2, wherein the base assembly further comprises:
an opening defined by the outer base shell within the recess, wherein the spindle gear is disposed within the opening.

4. The seating assembly of claim 2, wherein the base assembly further comprises:
first and second opposing ball bearing inserts disposed within the recess.

5. The seating assembly of claim 1, further comprising:
an inner shell operably coupled with an outer shell, wherein the gear plate is disposed between the inner shell and the outer shell.

6. The seating assembly of claim 5, further comprising:
a guide shoe retainer slidably coupled to the inner shell and rotatably coupled to the base assembly.

7. A seating assembly comprising:
a base assembly defining a recess, wherein a spindle gear is disposed within the recess;
a shell assembly operably coupled to the base assembly within the recess and including a gear plate;
a plurality of ball bearing inserts positioned within the recess and configured to contact the shell assembly; and
a control assembly including a locking key selectively engageable with both the spindle gear and the gear plate to control movement of the shell assembly relative to the base assembly.

8. The seating assembly of claim 7, wherein the control assembly further comprises:
a locking leaf spring operably coupled to the locking key; and
an actuator configured to move the locking key between an engaged position, an intermediate position, and a released position.

9. The seating assembly of claim 8, wherein the actuator is coupled to a handle disposed on the shell assembly.

10. A seating assembly for a vehicle comprising:
a base assembly coupled to a floor of said vehicle;
a shell assembly operably coupled to the base assembly and including a reclining feature and a rotating feature, wherein both the reclining feature and the rotating feature are selectively engaged with a single locking key, and wherein the reclining feature includes a gear plate; and
a control assembly including a handle configured to alternate the locking key between an engaged position and a released position.

11. The seating assembly of claim 10, wherein the base assembly includes an inner base shell nested within an outer base shell and a spindle gear nested between the inner base shell and the outer base shell.

12. The seating assembly of claim 11, wherein the shell assembly is secured to the base assembly using a retaining assembly positioned through the spindle gear.

13. The seating assembly of claim 12, wherein the retaining assembly further comprises:
a guide shoe retainer;
a sleeve; and
a bolt.

14. The seating assembly of claim 10, wherein the locking key is selectively engageable with one of the spindle gear and the gear plate and is subsequently engageable with the other of the spindle gear and the gear plate.

15. The seating assembly of claim 10, wherein the control assembly further comprises:
a locking spring operably coupled to the locking key; and
an actuator coupled to the locking spring and configured to control the engagement of the locking spring.

16. The seating assembly of claim 15, wherein the actuator is coupled to the handle disposed proximate the shell assembly.

17. The seating assembly of claim 10, wherein the shell assembly forms headrest wings around a headspace.

18. The seating assembly of claim 10, wherein the shell assembly includes armrests integrally formed with the shell assembly.

* * * * *